(12) United States Patent
Kusaka et al.

(10) Patent No.: US 9,857,534 B2
(45) Date of Patent: Jan. 2, 2018

(54) OPTICAL WAVEGUIDE DEVICE HAVING A LIGHT ABSORBER FOR SPLIT OUT MODES

(71) Applicant: FUJIKURA LTD., Tokyo (JP)

(72) Inventors: Hiroyuki Kusaka, Sakura (JP); Kensuke Ogawa, Sakura (JP); Kazuhiro Goi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/422,926

(22) PCT Filed: Aug. 13, 2013

(86) PCT No.: PCT/JP2013/071843
§ 371 (c)(1),
(2) Date: Feb. 20, 2015

(87) PCT Pub. No.: WO2014/030575
PCT Pub. Date: Feb. 27, 2014

(65) Prior Publication Data
US 2015/0241633 A1  Aug. 27, 2015

(30) Foreign Application Priority Data

Aug. 22, 2012 (JP) .................................. 2012-183306

(51) Int. Cl.
*G02B 6/28* (2006.01)
*G02B 6/125* (2006.01)
(Continued)

(52) U.S. Cl.
CPC ........... *G02B 6/2821* (2013.01); *G02B 6/122* (2013.01); *G02B 6/125* (2013.01); *G02B 6/14* (2013.01);
(Continued)

(58) Field of Classification Search
None
See application file for complete search history.

(56) References Cited

U.S. PATENT DOCUMENTS 3,995,238 A * 11/1976 Knox ......................... H01P 1/16
331/96
4,048,589 A * 9/1977 Knox ......................... H01P 1/16
331/101
(Continued)

FOREIGN PATENT DOCUMENTS

| CN | 1290354 A | 4/2001 |
| CN | 102308246 A | 1/2012 |

(Continued)

OTHER PUBLICATIONS

Machine translation of Japanese patent publication No. 2007127748 of Kitagawa dated May 24, 2007.*
(Continued)

*Primary Examiner* — Andrew Jordan
(74) *Attorney, Agent, or Firm* — Sughrue Mion, PLLC

(57) ABSTRACT

An optical waveguide device includes: a mode splitter including a main waveguide in which lights can be propagated in at least two propagation modes with different propagation orders and a subsidiary waveguide which includes a coupling section disposed in parallel with the main waveguide at a certain distance away from the main waveguide so as to constitute a directional coupler and is capable of splitting at least one propagation mode out of the two or more propagation modes from the main waveguide. Also, $n_{core}/n_{cladding}$ which is a refractive index ratio between a core and a cladding which constitute the main waveguide and the subsidiary waveguide is in a range of 101% to 250%.

34 Claims, 15 Drawing Sheets

(51) Int. Cl.
  *G02B 6/14* (2006.01)
  *G02F 1/225* (2006.01)
  *G02B 6/122* (2006.01)
  *G02B 6/293* (2006.01)
  *G02F 1/21* (2006.01)

(52) U.S. Cl.
  CPC ............ *G02F 1/225* (2013.01); *G02F 1/2255* (2013.01); *G02B 6/2813* (2013.01); *G02B 6/2935* (2013.01); *G02F 2001/212* (2013.01)

(56) References Cited

U.S. PATENT DOCUMENTS

| | | | | |
|---|---|---|---|---|
| 4,072,902 | A * | 2/1978 | Knox | H01P 1/16 455/318 |
| 5,165,001 | A * | 11/1992 | Takagi | G02B 6/2821 385/42 |
| 5,926,600 | A | 7/1999 | Pavlath | |
| 7,519,240 | B1 * | 4/2009 | Little | G02B 6/12007 385/1 |
| 7,734,122 | B1 * | 6/2010 | Mackie | G02B 6/12007 385/14 |
| 8,270,788 | B2 * | 9/2012 | Herman | G02B 6/02128 264/1.37 |
| 8,442,369 | B2 * | 5/2013 | McGreer | G02B 6/125 385/31 |
| 8,602,561 | B2 * | 12/2013 | Klein | G03B 21/14 353/20 |
| 9,075,192 | B2 * | 7/2015 | Adams | G02B 6/2813 |
| 9,531,159 | B2 * | 12/2016 | Li | G02B 6/125 |
| 2002/0001446 | A1 | 1/2002 | Arakawa et al. | |
| 2004/0141690 | A1 | 7/2004 | Jacquin et al. | |
| 2008/0002926 | A1 | 1/2008 | Kondou et al. | |
| 2011/0194802 | A1 | 8/2011 | Sugiyama et al. | |
| 2011/0305412 | A1 | 12/2011 | Sugiyama | |
| 2012/0027337 | A1 | 2/2012 | Kondou et al. | |
| 2012/0044459 | A1 * | 2/2012 | Klein | G03B 21/14 353/8 |
| 2012/0183249 | A1 * | 7/2012 | Sato | G02F 1/025 385/2 |
| 2013/0064492 | A1 | 3/2013 | Ishikawa et al. | |
| 2013/0195400 | A1 | 8/2013 | Miyazaki et al. | |
| 2013/0251301 | A1 | 9/2013 | Oikawa et al. | |
| 2014/0086522 | A1 * | 3/2014 | Adams | G02B 6/2813 385/3 |
| 2015/0043866 | A1 * | 2/2015 | Chen | G02F 1/2255 385/3 |
| 2015/0241633 | A1 * | 8/2015 | Kusaka | G02B 6/125 385/1 |
| 2015/0253501 | A1 * | 9/2015 | Li | G02B 6/125 385/14 |

FOREIGN PATENT DOCUMENTS

| | | | | |
|---|---|---|---|---|
| EP | 1 868 025 | A1 | 12/2007 | |
| JP | 05-164926 | A | 6/1993 | |
| JP | 2002-014242 | A | 1/2002 | |
| JP | 2002-539464 | A | 11/2002 | |
| JP | 2006-505812 | A | 2/2006 | |
| JP | 2006-235380 | A | 9/2006 | |
| JP | 2006-301612 | A | 11/2006 | |
| JP | 2007-127748 | A | 5/2007 | |
| JP | 2008-089875 | A | 4/2008 | |
| JP | 2010-266628 | A | 11/2010 | |
| JP | 2010-281899 | A | 12/2010 | |
| JP | 201 1-1 58730 | A | 8/2011 | |
| JP | 2011-164388 | A | 8/2011 | |
| JP | 2011-186258 | A | 9/2011 | |
| JP | 2011-257634 | A | 12/2011 | |
| JP | 2012-027199 | A | 2/2012 | |
| JP | WO 2012043694 | A1 * | 4/2012 | ............ G02B 6/125 |
| JP | 2012-154980 | A | 8/2012 | |
| JP | 5071542 | B2 * | 11/2012 | ............ G02B 6/125 |
| JP | 2013-152272 | A | 8/2013 | |
| JP | 2014-041252 | A | 3/2014 | |
| JP | 2014-041253 | A | 3/2014 | |
| WO | 99/28772 | A1 | 6/1999 | |
| WO | 2006/090863 | A1 | 8/2006 | |
| WO | 2010/113921 | A1 | 10/2010 | |
| WO | 2012/043694 | A1 | 4/2012 | |
| WO | 2012/056507 | A1 | 5/2012 | |

OTHER PUBLICATIONS

Communication dated Oct. 6, 2015 from the European Patent Office in counterpart European Application No. 13831402.6.
Hiroshi Fukuda, Koji Yamada, Tai Tsuchizawa, Toshifumi Watanabe, Hiroyuki Shinojima, and Sei-ichi Itabashi, "Silicon photonic circuit with polarization diversity", Optics Express, 2008, vol. 16, No. 7, pp. 4872 to 4880.
"Introduction to optical waveguide analysis", written by Yabu Tetsuro, edited by Yamauchi Junji, published by Morikita Publishing Co., Ltd., Sep. 2007, Chapter 4, 24 total pages.
Communication dated Nov. 19, 2015, issued by the Intellectual Property Office of Singapore in counterpart application 11201501230T.
Communication dated Jul. 5, 2016 from the Intellectual Property Office of Singapore in counterpart application No. 11201501230T.
Communication dated Apr. 25, 2017, from the State Intellectual Property Office of People's Republic of China in counterpart Application No. 201380043909.9, No translation.

* cited by examiner

BASIC MODE

HIGH-ORDER MODE

OPTICAL WAVEGUIDE DEVICE HAVING A LIGHT ABSORBER FOR SPLIT OUT MODES

CROSS REFERENCE TO RELATED APPLICATIONS

This is a National Stage of International Application No. PCT/JP2013/071843 filed Aug. 13, 2013, claiming priority based on Japanese Patent Application No. 2012-183306 filed Aug. 22, 2012, the contents of all of which are incorporated herein by reference in their entirety.

TECHNICAL FIELD

The present invention relates to an optical waveguide device including a mode splitter. In addition, the present invention relates to an optical waveguide device including a Mach-Zehnder optical modulator and a mode splitter.

Priority is claimed on Japanese Patent Application No. 2012-183306, filed Aug. 22, 2012, the content of which is incorporated herein by reference.

BACKGROUND ART

Regarding propagation modes in optical waveguides, when the mode numbers n for polarized waves orthogonal to each other are numbered to be 0, 1, 2, . . . in descending order of the effective refractive index, the propagation mode with n=0 is referred to as a basic mode, and other modes are referred to as nth-order modes in proportion to the respective mode numbers.

In addition, modes with are collectively referred to as high-order modes.

In recent years, a Si optical waveguide, in which silica ($SiO_2$) is used for a cladding and silicon (Si) is used for a core, has been attracting attention and anticipation since the size of the optical waveguide can be decreased using a large refractive index difference ($Si/SiO_2$) and the optical waveguide can be manufactured at a relatively low cost using the existing manufacturing facilities for Si large-scale integrated (LSC) circuits.

In an optical waveguide, a Mach-Zehnder (MZ) optical modulator is constituted using an optical coupler/splitter such as a multi-mode interferometer (MMI)-type coupler/splitter or a Y-type coupler/splitter. The MZ optical modulator is disposed along an MZ waveguide and includes a modulating electrode that applies voltage. The MZ optical modulator alters the optical phase between branched waveguides (arms) of the MZ waveguide using the voltage applied by the modulating electrode and turns a light ON/OFF using the interference phenomenon in a coupler on the ejection side. In a case in which two lights in the basic mode are input to the coupler in phase, the coupled light of the two lights is also in the basic mode, and the light is guided to an output waveguide (ON state). On the other hand, in a case in which two lights are in opposite phases, the coupled light is in a high-order mode. In an ordinary MZ optical modulator, since the width of the waveguide is set so that only lights in the basic mode are guided, the coupled light is radiated outside from the waveguide (OFF state).

In the MZ optical modulator, there is a problem in that lights in a radiation mode generated in the coupler propagate through a substrate and couple with lights in a waveguide mode and thus the extinction ratio deteriorates. Therefore, methods for splitting and removing (for example PTL 1 and 2) or blocking (for example, PTL 3) the radiation-mode lights are known.

Furthermore, even in the splitter in the MZ optical modulator, when a high-order-mode light is mixed in, the branching ratio deteriorates and thus the extinction ratio deteriorates. In order to solve this problem, as a method for preventing high-order-mode lights from being mixed into the splitter, PTL 4 discloses that, in a waveguide made of $LiNbO_3$ or the like, high-order-mode lights are removed by decreasing the width of the waveguide in front of the splitter so as to decrease the effective refractive index. PTL 5 discloses that, with an assumption of silica-based glass waveguides, lights in high-order modes are removed from the main waveguide by disposing a subsidiary waveguide having a tapered structure along the main waveguide and using adiabatic transition.

As one of the related arts regarding $Si/SiO_2$ waveguides, NPL 1 (Sections 2.2 and 3.2, FIGS. 1 and 4, and the like) discloses that polarization modes can be split at a length of approximately 10 μm using a polarization splitter (PS) in which a directional coupler (DC) made up of two Si waveguides having a thickness of 200 nm, a width of 400 nm, and a gap of 480 nm is used.

PRIOR ART DOCUMENTS

Patent Documents

[PTL 1] Japanese Unexamined Patent Application, First Publication No. 2011-164388
[PTL 2] Japanese Unexamined Patent Application, First Publication No. 2011-186258
[PTL 3] Japanese Unexamined Patent Application, First Publication No. 2006-301612
[PTL 4] Japanese Unexamined Patent Application, First Publication No. 2011-257634
[PTL 5] Japanese Unexamined Patent Application, First Publication No. 2006-235380

Non-Patent Documents

[NPL 1] Hiroshi Fukuda, Koji Yamada, Tai Tsuchizawa, Toshifumi Watanabe, Hiroyuki Shinojima, and Sei-ichi Itabashi, "Silicon photonic circuit with polarization diversity", Optics Express, 2008, Vol. 16, Issue 7, pp 4872 to 4880
[NPL 2] "Introduction to optical waveguide analysis", written by Yabu Tetsuro, edited by Yamauchi Junji, published by Morikita Publishing Co., Ltd., September 2007, Chapter 4

DISCLOSURE OF INVENTION

Problem to Solved by Invention

In PTL 1 to 4, waveguides for which a $LiNbO_3$ or silica-based waveguide is used are assumed, and the waveguides are designed so as to allow only lights in the basic mode to propagate. In these constitutions, the high-order mode is the radiation mode and thus lights to be radiated are split and removed or are blocked. Therefore, the relative refractive index difference of the $Si/SiO_2$ waveguide is significantly larger than the relative refractive index difference of the $LiNbO_3$ or silica-based waveguide. Therefore, the situation is significantly different from a case in which the $LiNbO_3$ or silica-based waveguide is used and thus it is difficult to apply the techniques of PTL 1 to 4 to the $Si/SiO_2$ waveguide. That is, in the $Si/SiO_2$ waveguide, in order to guide only lights in the basic mode, for example, in a waveguide in which the cladding is made of $SiO_2$ and the thickness of the Si core is 220 nm, it is necessary to set the core width to 450 nm or less. However, when the width of the waveguide is decreased, the energy density increases and the influence of surface roughness increases and thus the waveguide loss increases. According to the present inventors' studies, while the waveguide loss is approximately 0.16 dB/mm when the core width is 500 nm, the waveguide loss reaches approximately 0.40 dB/mm when the core width is 400 nm, which shows that the waveguide loss with a core width of 400 nm is approximately 2.5 times the waveguide loss with a core width of 500 nm. That is, as the core width decreases, the waveguide loss increases and the waveguide characteristics easily deteriorate due to surface roughness.

In order to decrease the effective refractive index to guide only lights in the basic mode in the waveguide, the alteration of the concentration of impurities in the waveguide or the depth of the waveguide can be considered in addition to the alteration of the width of the waveguide. However, an increase in the concentration of impurities causes an increase in the optical loss and the alteration of the depth of the waveguide is not easy in terms of the manufacturing process. As described above, attempts to guide only lights in the basic mode in the $Si/SiO_2$ waveguide bring about huge hindrances in terms of the waveguide characteristics and the manufacturing process.

According to the technique disclosed in PTL 5, in order to obtain favorable branching characteristics during branching (splitting) through adiabatic transition, a smooth tapered section is required. A reference of the "simulation" in Chapter 4 of NPL 2 shows that the length of a branching unit necessary for first-order-mode branching through adiabatic transition is approximately 1000λ when the wavelength λ is used as the unit. When the wavelength of an incident light is set to 1.55 μm, the length of the tapered section needs to be approximately 1.5 μm. In Example 1 of PTL 5, it is disclosed that a taper length of 2 mm is required for the wavelength of an incident light of 1.5 μm. In devices having a great relative refractive index difference such as the $Si/SiO_2$ waveguide, it is a great advantage to decrease the sizes of optical devices using devices on the order of micrometers for which a high refractive index difference is used and thus it is not possible to mount millimeter-sized devices such as the tapered section in PTL 5.

Furthermore, there is another problem with the manufacturing of the $Si/SiO_2$ waveguide. In PTL 5, since lights in the basic mode and lights in the first-order mode are split through adiabatic transition, the gap between two waveguides needs to be extremely small compared with the width of the waveguides. For example, in the case of the $Si/SiO_2$ waveguide having a core width of 500 nm, in some cases, the gap between the waveguides makes the manufacturing of the waveguide extremely difficult. Similarly, since it is difficult to form the tapered structure of the subsidiary waveguide in the $Si/SiO_2$ waveguide having a core width of 500 nm, the manufacturing cost significantly increases.

NPL 1 discloses the device capable of splitting the polarization modes but does not disclose any devices capable of splitting propagation modes with different mode numbers n (for example, the splitting of the basic mode and the high-order mode).

The present invention has been made in consideration of the above-described problems and an object of the present invention is to provide an optical waveguide device including a mode splitter capable of splitting modes. In addition, another object of the present invention is to provide an optical waveguide device including a mode splitter capable of splitting modes from optical waveguides in an optical waveguide device including a Mach-Zehnder optical modulator configured to have waveguides in which lights can be propagated in two or more propagation modes.

Means for Solving the Problems

According to a first aspect of the present invention, there is provided an optical waveguide device including a mode splitter including a main waveguide in which lights can be propagated in at least two propagation modes with different propagation orders and a subsidiary waveguide which includes a coupling section disposed in parallel with the main waveguide at a certain distance away from the main waveguide so as to constitute a directional coupler and is capable of splitting at least one propagation mode out of the two or more propagation modes from the main waveguide, in which $n_{core}/n_{cladding}$ which is a refractive index ratio between a core and a cladding which constitute the main waveguide and the subsidiary waveguide is in a range of 101% to 250%.

A difference between a width of the main waveguide and a width of the subsidiary waveguide in the directional coupler may be within ±10% or less.

A difference between a thickness of the main waveguide and a thickness of the subsidiary waveguide in the directional coupler may be within ±10% or less.

The subsidiary waveguide may further include an initiation section connected to a front end section of the coupling section and the subsidiary waveguide may smoothly curve toward the main waveguide as the initiation section curves toward the front end section.

The subsidiary waveguide may further include a termination section connected to a rear end section of the coupling section and the subsidiary waveguide may smoothly curve away from the main waveguide as the termination section separates from the rear end section.

The optical waveguide device may include a plurality of the mode splitters, in which a difference between a width of the main waveguide and a width of the subsidiary waveguide in each directional coupler may be within ±10% or less and a gap between the coupling section of the subsidiary waveguide and the main waveguide and a length of the coupling section of the subsidiary waveguide may be equal in every directional coupler.

The optical waveguide device may include a plurality of the mode splitters, in which a difference between a width of the main waveguide and a width of the subsidiary waveguide in each directional coupler may have substantially the same width as the main waveguide within ±10% or less and a gap between the coupling section of the subsidiary waveguide and the main waveguide and a length of the coupling section of the subsidiary waveguide in which the subsidiary waveguide is placed in parallel with the main waveguide may vary in every directional coupler.

A material of the core may be Si and a material of the cladding may be $SiO_2$.

The subsidiary waveguide may be constituted so as to split high-order modes from the main waveguide.

The optical waveguide device may further include a light-absorbing layer which is disposed at a front end of the termination section of the subsidiary waveguide and is doped with impurities at a high concentration.

The optical waveguide device may further include a photo detector and an electric wire for ejecting a current from the photo detector which are disposed at a front end of the termination section of the subsidiary waveguide.

According to a second aspect of the present invention, there is provided an optical waveguide device including a Mach-Zehnder optical modulator including a splitter section that splits one input light into two split lights, a coupler section that couples the two split lights into one output light, and a main waveguide in which lights can be propagated in at least two propagation modes with different propagation orders and which guides the input light, the split lights, and the output light, and one or more mode splitters including a subsidiary waveguide which includes a coupling section disposed in parallel with the main waveguide at a certain distance away from the main waveguide so as to constitute a directional coupler and is capable of splitting at least one propagation mode out of the two or more propagation modes from the main waveguide, in which $n_{core}/n_{cladding}$ which is a refractive index ratio between a core and a cladding which constitute the main waveguide and the subsidiary waveguide is in a range of 101% to 250%.

A difference between a width of the main waveguide and a width of the subsidiary waveguide in the directional coupler may be within ±10% or less.

A difference between a thickness of the main waveguide and a thickness of the subsidiary waveguide in the directional coupler may be within ±10% or less.

The subsidiary waveguide may further include an initiation section connected to a front end section of the coupling section and the subsidiary waveguide may smoothly curve toward the main waveguide as the initiation section curve toward the front end section.

The subsidiary waveguide may further include a termination section connected to a rear end section of the coupling section and the subsidiary waveguide may smoothly curve away from the main waveguide as the termination section separates from the rear end section.

The optical waveguide device may further include a Mach-Zehnder interferometer including a plurality of the Mach-Zehnder optical modulators therein.

The optical waveguide device may include a plurality of the mode splitters, in which a difference between a width of the main waveguide and a width of the subsidiary waveguide in each directional coupler may be within ±10% or less and a gap between the coupling section of the subsidiary waveguide and the main waveguide and a length of the coupling section of the subsidiary waveguide may be equal in every directional coupler.

The optical waveguide device may include a plurality of the mode splitters, in which a difference between a width of the main waveguide and a width of the subsidiary waveguide in each directional coupler may be within ±10% or less and a gap between the coupling section of the subsidiary waveguide and the main waveguide and a length of the coupling section of the subsidiary waveguide may vary in every directional coupler.

The splitter section and the coupler section may be an MMI-type optical coupler/splitter.

The splitter section and the coupler section may be a Y-type optical coupler/splitter.

A material of the core may be Si and a material of the cladding may be $SiO_2$.

The subsidiary waveguide may be constituted so as to split high-order modes from the main waveguide.

The optical waveguide device may include a light-absorbing layer which is disposed at a front end of the termination section of the subsidiary waveguide and is doped with impurities at a high concentration.

The optical waveguide device may include a photo detector and an electric wire for ejecting a current from the photo detector which are disposed at a front end of the termination section of the subsidiary waveguide.

Effects of the Invention

According to the optical waveguide device of the aspects of the present invention, modes can be split using the mode splitter.

In addition, according to the optical waveguide device of the aspects of the present invention, in the Mach-Zehnder optical modulator constituting the waveguide in which lights can be propagated in at least two propagation modes with different propagation orders, modes can be split from the optical waveguide using the mode splitter.

EMBODIMENTS FOR CARRYING OUT THE INVENTION

Figure 1A:
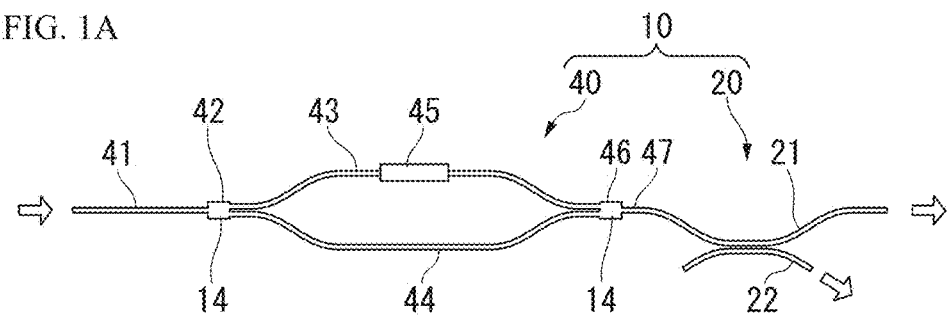
FIG. 1A is a plan view illustrating a first embodiment of an optical waveguide device.
Figure 1B:
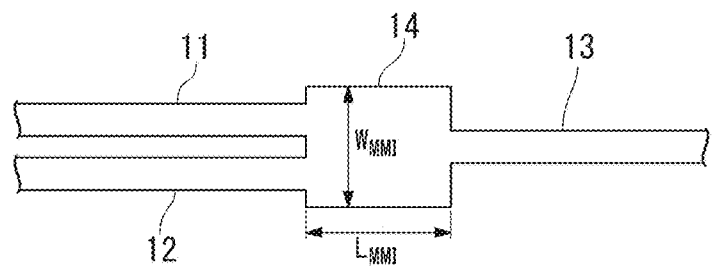
FIG. 1B is an enlarged partial plan view illustrating an MMI-type optical coupler/splitter in FIG. 1A.
Figure 1C:
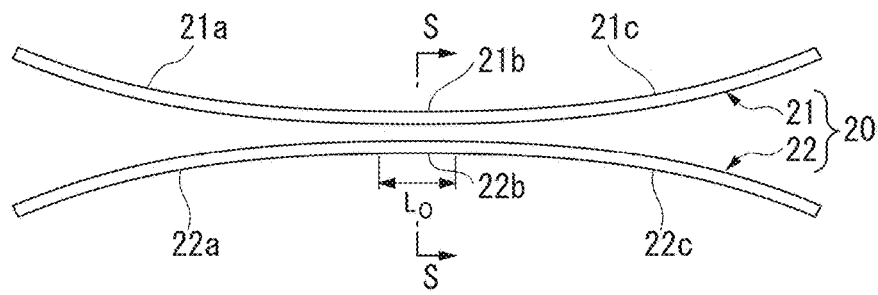
FIG. 1C is an enlarged partial plan view illustrating a mode splitter in FIG. 1A.
Figure 1D:
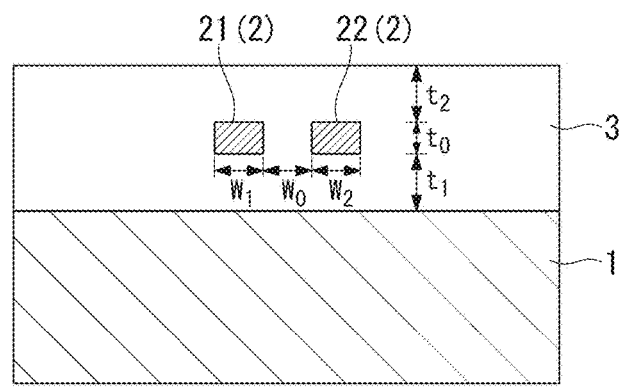
FIG. 1D is a cross-sectional view in the direction of the S-S line in FIG. 1C.

Hereinafter, the present invention will be described on the basis of preferred embodiments with reference to the accompanying drawings. FIGS. 1A to 1D illustrate an optical waveguide device according to a first embodiment of the present invention. As illustrated in FIG. 1D, an optical waveguide device 10 includes optical waveguides (a main waveguide and a subsidiary waveguide) having a core 2 and a cladding 3 on a substrate 1. FIGS. 1A to 1C only illustrate portions corresponding to the core 2 and these portions will be described as the optical waveguides.

As illustrated in FIG. 1A, the optical waveguide device 10 includes a Mach-Zehnder optical modulator 40. The Mach-Zehnder optical modulator 40 includes an optical splitter section 42 that splits one input light into two output lights (split lights), an optical coupler section 46 that couples two input lights (split lights) into one output light, and an optical modulating unit 45. One output light from the optical splitter section 42 is input to the optical coupler section 46 through a waveguide 43 having the optical modulating unit 45, and the other output light from the optical splitter section 42 is input to the optical coupler section 46 through a waveguide 44 having no optical modulating unit 45.

A light injected into the optical splitter section 42 from an optical waveguide 41 provided in front of the optical splitter section 42 is split into two lights, and the two lights propagate through separate waveguides (arms) 43 and 44. The optical modulating unit 45 is generally a phase modulator. The light having propagated through the optical modulating unit 45 and the light not having propagated through the optical modulating unit 45 have a predetermined phase difference and, when both lights are injected into the optical coupler section 46, the light coupled in the optical coupler section 46 is modulated according to the phase difference. For example, the switching between the ON state and the OFF state of an optical signal is controlled using the phase difference between the two lights injected into the optical coupler section 46. In a case in which two lights are injected into the optical coupler section 46 in phase, the coupled light propagates through an optical waveguide 47 in the rear section in a basic mode, and the optical signal changes into the ON state. On the contrary, in a case in which two lights are injected into the optical coupler section 46 out of phase, the coupled light propagates through the optical waveguide 47 in the rear section in a first-order mode, and the optical signal changes into the OFF state. When a waveguide having a broad core such as a multi-mode waveguide is used as the waveguides (main waveguides) 41, 43, 44, and 47, the deterioration in waveguide features attributed to surface roughness does not easily occur, which is preferable.

The optical waveguide device 10 of FIGS. 1A to 1D also includes a mode splitter 20 provided in the rear section which is on the output side of the optical coupler section 46 in the Mach-Zehnder optical modulator 40. The output light from the optical coupler section 46 is injected into the mode splitter 20 through the ejection-side waveguide 47.

There is no particular limitation regarding devices constituting the optical splitter section 42 and the optical coupler section 46 in the Mach-Zehnder optical modulator 40, and examples thereof include MMI-type splitters or couplers, Y-type splitters or couplers, directional couplers, and the like. A multi-mode interference (MMI)-type coupler/splitter 14 illustrated in FIG. 1B has a predetermined length $L_{MMI}$ and a predetermined width $W_{MMI}$ that is broader than the widths of waveguides 11, 12, and 13.

In a case in which a light is input from the waveguides 11 and 12, the respective input lights are guided and interfered with together in a multi-mode in the coupler/splitter 14, whereby a light produced by coupling the respective input lights is output from the waveguide 13.

In addition, in a case in which a light is input from the waveguide 13, the input light is guided and interfered with in a multi-mode in the coupler/splitter 14, whereby the input light is split into multiple output lights and the multiple lights are output from the waveguides 11 and 12. When a waveguide having a broad core such as a multi-mode waveguide is used as the waveguides 11, 12, and 13, the deterioration in waveguide features attributed to surface roughness does not easily occur, which is preferable.

As illustrated in FIG. 1C, the mode splitter 20 includes a main waveguide 21 and a subsidiary waveguide 22 provided away from the main waveguide 21. The main waveguide 21 is desirably a waveguide in which lights can be propagated in at least two propagation modes with different propagation orders. When a waveguide having a broad core such as a multi-mode waveguide is used as the main waveguide 21, the deterioration in waveguide features attributed to surface roughness does not easily occur.

The subsidiary waveguide 22 splits, from the main waveguide 21, one or more propagation modes with different propagation orders out of the two or more propagation modes with different propagation orders in which lights can be propagated through the main waveguide 21. Therefore, the main waveguide 21 and the subsidiary waveguide 22 include coupling sections 21b and 22b that are placed in parallel with each other with a certain gap therebetween, and these coupling sections 21b and 22b constitute a directional coupler having a length $L_0$. Furthermore, the mode splitter 20 in the drawing has a structure in which the main waveguide 21 and the subsidiary waveguide 22 smoothly curve toward each other in initiation sections 21a and 22a that extend toward the front end sections of the coupling sections 21b and 22b constituting the direction coupler. In addition, the mode splitter 20 has a structure in which the main waveguide 21 and the subsidiary waveguide 22 smoothly curve away from each other in termination sections 21c and 22c that extend toward the rear end sections of the coupling sections 21b and 22b. In other words, as shown in FIG. 1C, the initiation section 22a of the subsidiary waveguide 22 extends from an input end thereof to the coupling section 22b, and is substantially symmetrical, with respect to the coupling section 22b, to the termination section 22c which extends from the coupling section 22b to an output end of the subsidiary waveguide 22. The subsidiary waveguide 22 may be a waveguide in which lights can be propagated in at least two propagation modes with different propagation orders.

The mode splitter according to the first embodiment of the present invention will be described on the basis of mode coupling theories. When the subsidiary waveguide is placed in parallel with the main waveguide at a position near the main waveguide, it is possible to form the directional coupler. When the directional coupler is formed, generally, any modes of the main waveguide are coupled with the mode of the subsidiary waveguide. The intensity of the coupling from the mode of the main waveguide to the mode of the subsidiary waveguide is represented by a coupling coefficient $\chi_{21}$ which is expressed by Expression (1) described below.

[Expression 1]

$$\chi_{21} = C \iint (n_{core}^2 - n_{clad}^2) E_2^* \cdot E_1 \, dx \, dy \quad (1)$$

In Expression (1), C represents a constant including a normalization constant, $n_{core}$ represents the refractive index of the core, and $n_{cladding}$ represents the refractive index of the cladding. The subscripts 1 and 2 respectively represent the intrinsic modes ($E_1$ and $E_2$) of the main waveguide and the subsidiary waveguide. Variables x and y represent the width direction and thickness direction of the waveguide, and the integral range is within the core cross-section of the subsidiary waveguide.

As is clear from Expression (1), the degree of the coupling coefficient is dependent on how broad the electromagnetic field distribution of the intrinsic mode of the main waveguide spreads in the core cross-section of the subsidiary waveguide. Generally, the comparison between the basic mode and the high-order mode shows that a light propagates through the center of the core in the basic mode whereas a light propagates outside the waveguide in the high-order mode compared with in the basic mode (for example, refer to FIGS. 11A and 11B of Example 1 described below). Therefore, in the high-order mode such as a first-order mode, compared with the basic mode, it is anticipated that the main waveguide becomes more easily coupled with the subsidiary waveguide. In addition, generally, when the gap between the two waveguides forming the directional coupler (for example, refer to the gap $w_0$ in FIG. 1D) is increased, the coupling coefficient decreases both in the basic mode and in the high-order mode, but the coupling coefficient of the basic mode decreases more abruptly than the coupling coefficient of the high-order mode such as a first-order mode (for example, refer to FIG. 12 of Example 1 described below).

Therefore, when an appropriate gap between the two waveguides forming the directional coupler is selected, it is possible to sufficiently increase the difference in the coupling coefficient $\chi_{21}$ between the two or more propagation modes in which lights can be propagated through the main waveguide.

According to Expression (1) described above, in relation to the refractive index $n_{core}$ of the core and the refractive index $n_{cladding}$ of the cladding, the coupling coefficient $\chi_{21}$ is proportional to $n_{core}^2 - n_{cladding}^2$. Therefore, in order to increase the difference in the coupling coefficient between the modes, it is preferable to employ waveguide structures having a great refractive index difference. For example, $n_{core}/n_{cladding}$ is preferably in a range of 101% to 250%.

For example, in a case in which the material of the core is Si (refractive index: approximately 3.475) and the material of the cladding is $SiO_2$ (refractive index: approximately 1.444), a semiconductor-oriented material such as a silicon on insulator (SOI) substrate can be used as the waveguide material, which is preferable.

Examples of the core material include $SiO_x$ (refractive index: 1.47), SiON, SiN, non-silicon-based semiconductor materials (compound semiconductors), and the like.

When the two waveguide structures (materials, dimensions, shapes, and the like) are completely symmetric with each other in the directional coupler, the maximum power transfer ratio reaches 100%. Conversely, in a case in which the two waveguide structures are different from each other and the propagation constants of the modes are different from each other, the maximum power transfer ratio is smaller than 100%. Therefore, in a case in which the high-order mode such as a first-order mode is efficiently transferred to the subsidiary waveguide from the main waveguide, it is desirable to equalize the waveguide structures (materials, dimensions, shapes, and the like) of the main waveguide and the subsidiary waveguide as much as possible. For example, the width of the main waveguide and the width of the subsidiary waveguide (for example, refer to the widths $w_1$ and $w_2$ in FIG. 1) are preferably substantially equal to each other. For example, in a Si optical waveguide, it is also possible to use an older-generation exposure device in which KrF (248 nm) is used as a light source since this device is manufactured at a low cost. In a method for forming an ordinary waveguide core, there is a concern of the occurrence of errors attributed to the alignment accuracy, etching accuracy, or the like of an exposure mask. Therefore, in a case in which there is no intended change in the width of the waveguide (core width) unlike a taper-shaped waveguide (refer to the related art), the difference between the width of the main waveguide and the width of the subsidiary waveguide is preferably, for example, within ±10% or less.

Similarly, the difference between the thickness of the main waveguide and the thickness of the subsidiary waveguide is preferably, for example, within ±10% or less.

In the directional coupler, the length of the directional coupler necessary to maximize the transfer of power from the main waveguide to the subsidiary waveguide is termed as the coupling length. The coupling length is dependent on the intensity of the coupling coefficient $\chi_{21}$. Generally, as the coupling coefficient $\chi_{21}$ decreases, the coupling length increases (for example, refer to FIGS. 12 and 13 of Example 1 described below).

For example, when, under conditions in which the coupling length in the basic mode becomes sufficiently longer than the coupling length in the high-order mode, the length of the directional coupler is decreased (for example, the length of the directional coupler is set to be substantially equal to or shorter than the coupling length of the high-order mode) and the proportion of the transfer in the high-order mode is sufficiently increased while the proportion of the transfer in the basic mode remains at a low level, it is possible to realize a mode splitter having a structure in which a specific high-order mode (for example, a first-order mode) can be split from the main waveguide to the subsidiary waveguide.

In a case in which the length of the directional coupler is longer than the coupling length in the high-order mode, the high-order mode is alternatively transferred between the main waveguide and the subsidiary waveguide. Therefore, in a case in which the length of the directional coupler is set to be substantially equal to the coupling length in the basic mode and the proportion of the high-order mode transferred to the subsidiary waveguide is decreased, it is considered that the mode splitter becomes a structure in which the basic mode can be split from the main waveguide to the subsidiary waveguide.

In a case in which the mode splitter has a structure in which the subsidiary waveguide splits the first-order mode from the main waveguide in which lights can be propagated in at least the basic mode and the first-order mode, the size of the mode splitter can be easily decreased, which is preferable. In this case, a subsidiary waveguide having substantially the same width as the main waveguide is disposed at a position near the main waveguide behind the coupler in parallel with the main waveguide, thereby forming the directional coupler. Furthermore, the length of the directional coupler and the gap between the main waveguide and the subsidiary waveguide are appropriately set using the significantly different coupling coefficients of a basic-mode light and a high-order-mode light. Therefore, it is possible to split only the high-order-mode light from the main waveguide to the subsidiary waveguide while the loss of the basic-mode light is suppressed and it is possible to constitute a coupler outputting only the basic-mode light.

Figure 3:
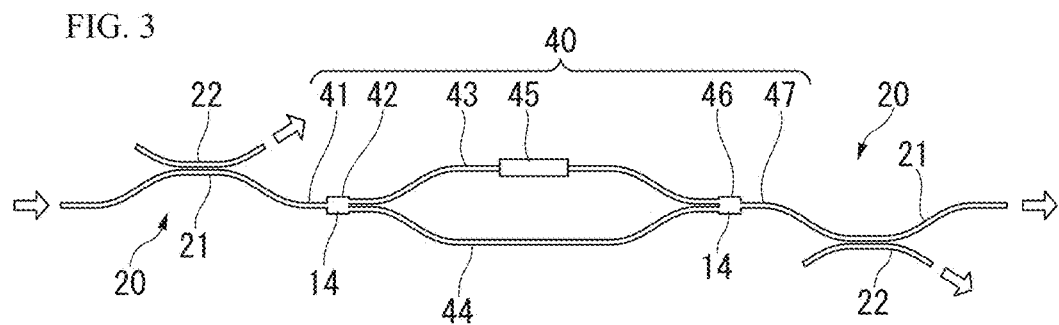
FIG. 3 is a plan view illustrating a second embodiment of the optical waveguide device.
Figure 4:
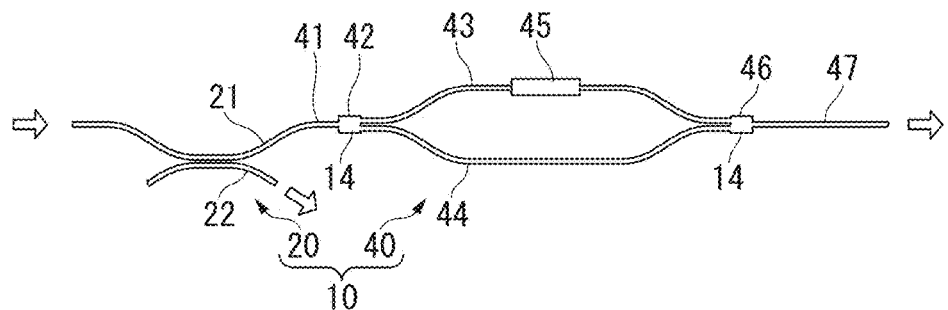
FIG. 4 is a plan view illustrating a third embodiment of the optical waveguide device.

In addition, although described below in detail, as illustrated in FIGS. 3 and 4, a subsidiary waveguide having substantially the same width as the main waveguide is disposed at a position near the main waveguide connected to the splitter in parallel with the main waveguide, thereby forming the directional coupler. Furthermore, the length of the directional coupler and the gap between the main waveguide and the subsidiary waveguide are appropriately set using the significantly different coupling coefficients of the basic-mode light and the high-order-mode light. Therefore, it is possible to split only the high-order-mode light from the main waveguide to the subsidiary waveguide while the loss of the basic-mode light is suppressed and it is possible to remove or decrease only the high-order-mode light from a light injected into the splitter and thus to suppress the deterioration in the branching ratio.

Thus far, the present invention has been described on the basis of the preferred embodiment, but the present invention is not limited to the above-described embodiment, and a variety of modifications are allowed within the scope of the purpose of the present invention.

Figure 2A:
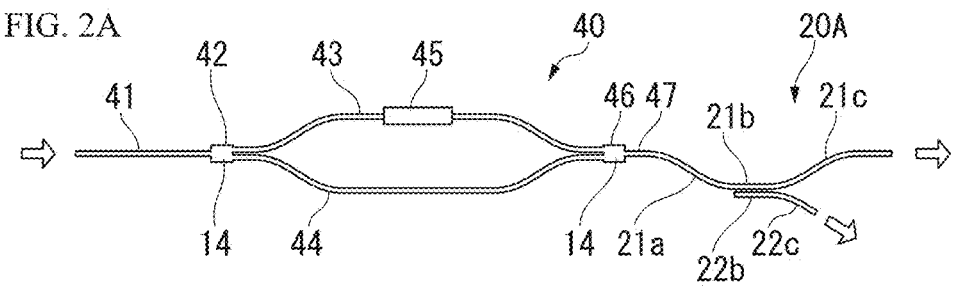
FIG. 2A is a plan view illustrating the optical waveguide device including the mode splitter having a different form.

In a mode splitter 20A in an optical waveguide device illustrated in FIG. 2A, the subsidiary waveguide includes a coupling section 22b which is a section constituting the directional coupler and a termination section 22c from which lights in modes split in the coupling section 22b are ejected, but does not include the initiation section (Reference Sign 22 in FIG. 1C) having a structure in which the subsidiary waveguide smoothly curve toward the main waveguide.

Figure 2B:
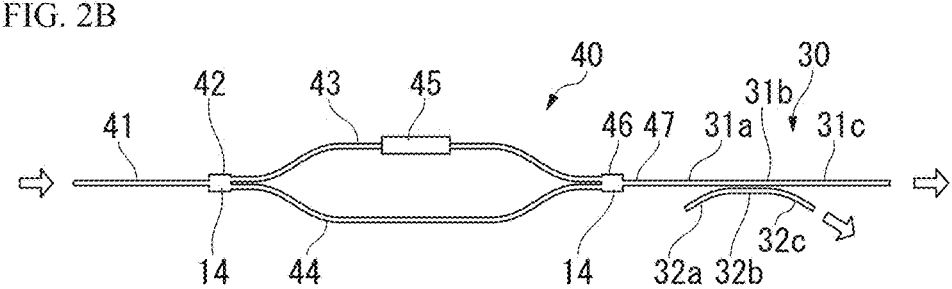
FIG. 2B is a plan view illustrating the optical waveguide device including the mode splitter having a different form.

In a mode splitter 30 in a waveguide device illustrated in FIG. 2B, the main waveguide has a straight shape from the initiation section 31a through the coupling section 31b to the termination section 31c.

The subsidiary waveguide in the mode splitter 30 includes an initiation section 32a having a structure in which the subsidiary waveguide smoothly curve toward the main waveguide, a coupling section 32b which is a section constituting the directional coupler, and a termination section 32c from which lights in modes split in the coupling section 32b are ejected.

Figure 2C:
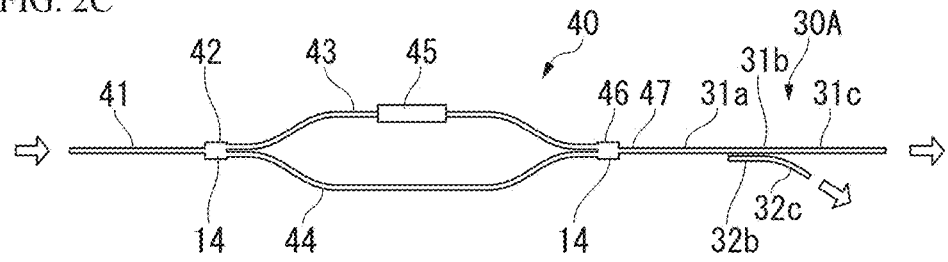
FIG. 2C is a plan view illustrating the optical waveguide device including the mode splitter having a different form.

In a mode splitter 30A in an optical waveguide device illustrated in FIG. 2C, the main waveguide has a straight shape from the initiation section 31a through the coupling section 31b to the termination section 31c. The subsidiary waveguide in the mode splitter 30A includes the coupling section 32b which is a section constituting the directional coupler and the termination section 32c from which lights in modes split in the coupling section 32b are ejected, but does not include the initiation section (Reference Sign 32a in FIG. 2B) having a structure in which the subsidiary waveguide smoothly curve toward the main waveguide.

In other embodiments as well such as second to tenth embodiments described below, the same devices as the above-described mode splitters 20A, 30, and 30A illustrated in FIGS. 2A to 2C may be used as the mode splitters. In FIGS. 2B and 2C, the main waveguide 21 forms a straight line and the subsidiary waveguide 22 forms a curved line. It is also possible to make the main waveguide 21 form a curved line and make the subsidiary waveguide 22 form a straight line.

From the viewpoint of the symmetry between the main waveguide and the subsidiary waveguide, the main waveguide and the subsidiary waveguide preferably have a symmetric planar shape at least in a position near the directional coupler as illustrated in FIG. 1C. The influence of the symmetry between the main waveguide and the subsidiary waveguide will be comparatively studied through simulation using a finite-difference time domain (FDTD) method in Example 2 described below (particularly, the comparison between FIGS. 19A and 19B). When the termination section 31c of the main waveguide in the mode splitter 30A in the optical waveguide device illustrated in FIG. 2C is curved in the same curved structure of the termination section 32c of the subsidiary waveguide, the mode splitter 20A having the symmetry illustrated in FIG. 2A can be obtained. Similarly, when the initiation section 31a of the main waveguide in the mode splitter 30 in the optical waveguide device illustrated in FIG. 2B is curved in the same curved structure of the initiation section 32a of the subsidiary waveguide and the termination section 31c of the main waveguide is curved in the same curved structure of the termination section 32c of the subsidiary waveguide, the mode splitter 20 having the symmetry illustrated in FIG. 1C can be obtained.

In the mode splitter 20 of FIG. 1C, the initiation section 21a of the main waveguide and the initiation section 22a of the subsidiary waveguide, the coupling section 21b of the main waveguide and the coupling section 22b of the subsidiary waveguide, and the termination section 21c of the main waveguide and the termination section 22c of the subsidiary waveguide are provided so as to be respectively symmetric with respect to a middle line linking the coupling sections 21b and 22b constituting the directional coupler as the symmetry center line (axis of symmetry). It can be appropriately selected whether the curvature radii of the curved sections (21a and 21c) of the main waveguide are equal to the curvature radii of the curved sections (22a and 22c) of the subsidiary waveguide, the curvature radii of the curved sections of the main waveguide are larger than the curvature radii of the curved sections of the subsidiary waveguide, or the curvature radii of the curved sections (21a and 21c) of the main waveguide are smaller than the curvature radii of the curved sections (22a and 22c) of the subsidiary waveguide.

At positions at which the main waveguide and the subsidiary waveguide have a sufficiently large gap therebetween, the waveguides can be extended or curved so as to have a desired disposition on the substrate. In addition, the orientation, length, and the like of the waveguides can be freely set. It is also possible to maintain the widths of the main waveguide and the subsidiary waveguide substantially constant throughout the entire length, not only at positions near the directional coupler.

The subsidiary waveguide has a small influence on the basic mode of the main waveguide and, in a case in which the initiation section having a structure in which the subsidiary waveguide smoothly curve toward the main waveguide is provided, the loss can be further decreased, which is preferable. The influence of the subsidiary waveguide on the basic mode of the main waveguide will be comparatively studied through an electromagnetic simulation using the FDTD method (described above) in Example 2 described below (particularly, the comparison between FIGS. 19B and 19C). When the initiation section of the subsidiary waveguide in the mode splitter 30A in the optical waveguide device illustrated in FIG. 2C is curved in the same curved structure of the termination section 32c of the subsidiary waveguide, the mode splitter 30 having a section in which the subsidiary waveguide smoothly curve toward the main waveguide as illustrated in FIG. 2B can be obtained. Similarly, when the initiation section of the subsidiary waveguide in the mode splitter 20A in the optical waveguide device illustrated in FIG. 2A is curved in the same curved structure of the termination section 22c of the subsidiary waveguide, the mode splitter 20 having a section in which the subsidiary waveguide smoothly curve toward the main waveguide as illustrated in FIG. 1A can be obtained. When a light travelling through the main waveguide encounters the subsidiary waveguide that is discontinuously formed, the light is easily reflected or disturbed and the loss of the light increases. When the subsidiary waveguide smoothly curve toward the main waveguide, the loss can be further decreased.

Similarly, in a case in which the termination section having a structure in which the subsidiary waveguide smoothly curves away from the main waveguide is provided, the loss of a light can be further decreased, which is preferable.

The structure in which the main waveguide smoothly curve toward or curves away from the subsidiary waveguide is preferably constituted along a curved line such as a circular arc, an elliptic arc, a parabolic line, or a hyperbolic line. The curvature radius of the curved line is preferably, for example, 10 μm or more. Since the curvature radius of a straight line is infinite, there is no upper limit for the curvature radius for continuously connecting the straight section and the curved section, but the curvature radius of the curved section coming closer to the straight section is, for example, in a range of several tens of μm to several hundreds of μm.

In the mode splitter 20 of FIG. 1C, the initiation section 21a of the main waveguide and the termination section 21c of the main waveguide and the initiation section 22a of the main waveguide and the termination section 22c of the subsidiary waveguide are provided so as to be respectively symmetric with respect to a bisector perpendicular to the coupling sections 21b and 22b constituting the directional coupler as the symmetry center line (axis of symmetry). It can be appropriately selected whether the curvature radius of the initiation section is equal to the curvature radius of the termination section, the curvature radius of the initiation section is larger than the curvature radius of the termination section, or the curvature radius of the initiation section is smaller than the curvature radius of the termination section.

FIG. 3 illustrates a second embodiment of the optical waveguide device. In the optical waveguide device according to the present embodiment, the main waveguide 21 in the mode splitter 20 is also connected to the optical waveguide 41 in front of the optical splitter section 42 in the Mach-Zehnder optical modulator 40. When a first-order-mode light is split into the subsidiary waveguide 22 before a light is input to the optical splitter section 42, it is possible to suppress the deterioration in the extinction ratio of the Mach-Zehnder optical modulator 40.

FIG. 4 illustrates a third embodiment of the optical waveguide device. In the optical waveguide device according to the present embodiment, the main waveguide 21 in the mode splitter 20 is only connected to the optical waveguide 41 in front of the optical splitter section 42 in the Mach-Zehnder optical modulator 40. When a first-order-mode light is split into the subsidiary waveguide 22 before a light is input to the optical splitter section 42, it is possible to suppress the deterioration in the extinction ratio of the Mach-Zehnder optical modulator 40.

Figure 5:
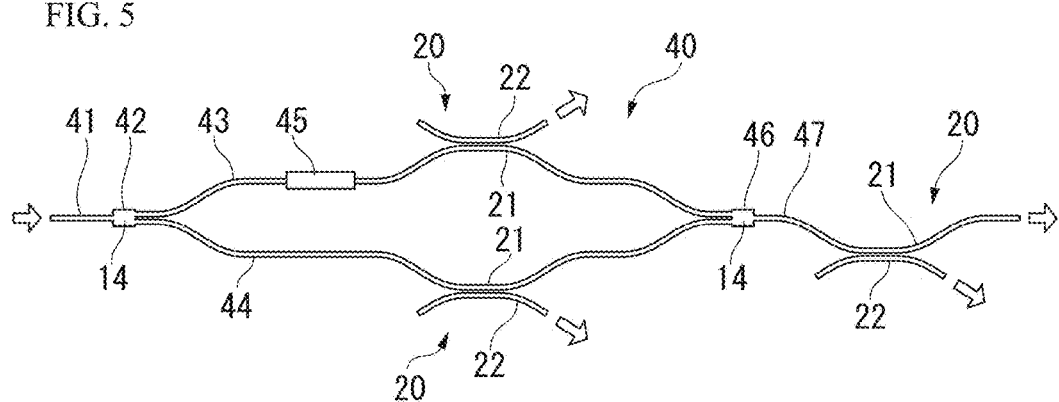
FIG. 5 is a plan view illustrating a fourth embodiment of the optical waveguide device.

FIG. 5 illustrates a fourth embodiment of the optical waveguide device. In the optical waveguide device according to the present embodiment, the main waveguides 21 in the mode splitters 20 are also connected to the optical waveguides 43 and 44 in the Mach-Zehnder optical modulator 40 (between the optical splitter section 42 and the optical coupler section 46). When a first-order-mode light is split into the subsidiary waveguides 22 before a light is input to the optical coupler section 46, it is possible to suppress the deterioration in the extinction ratio of the Mach-Zehnder optical modulator 40.

Figure 6:
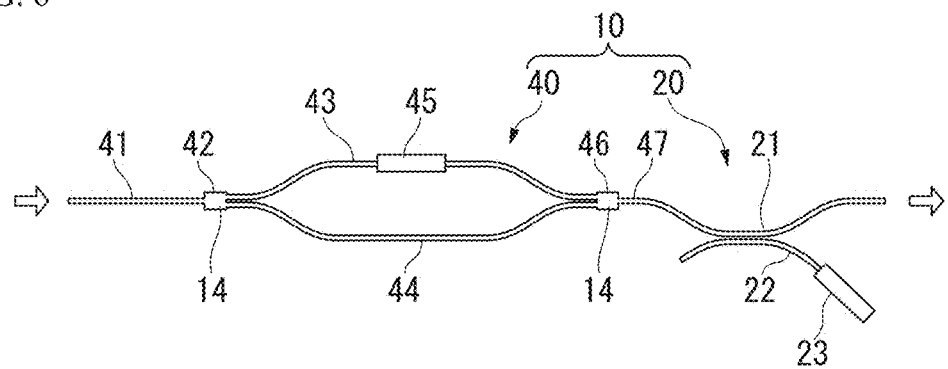
FIG. 6 is a plan view illustrating a fifth embodiment of the optical waveguide device.

FIG. 6 illustrates a fifth embodiment of the optical waveguide device. In the optical waveguide device according to the present embodiment, a light-absorbing layer 23 doped with a high concentration of impurities is provided at the front end of the termination section of the subsidiary waveguide 22 in the mode splitter 20 provided behind the optical coupler section 46 in the Mach-Zehnder optical modulator 40. In the light-absorbing layer 23, a high-order-mode light is absorbed, and thus the recoupling of the high-order-mode light to the main waveguide 21 can be prevented.

In other embodiments as well such as a case in which the mode splitter 20 is provided in front of the optical splitter section 42 (refer to FIGS. 3 and 4) or a case in which the mode splitters are provided at the optical waveguides 43 and 44 in the Mach-Zehnder optical modulator 40 (refer to FIG. 5), the light-absorbing layer 23 may be provided at the front end of the termination section of the subsidiary waveguide 22.

Figure 7:
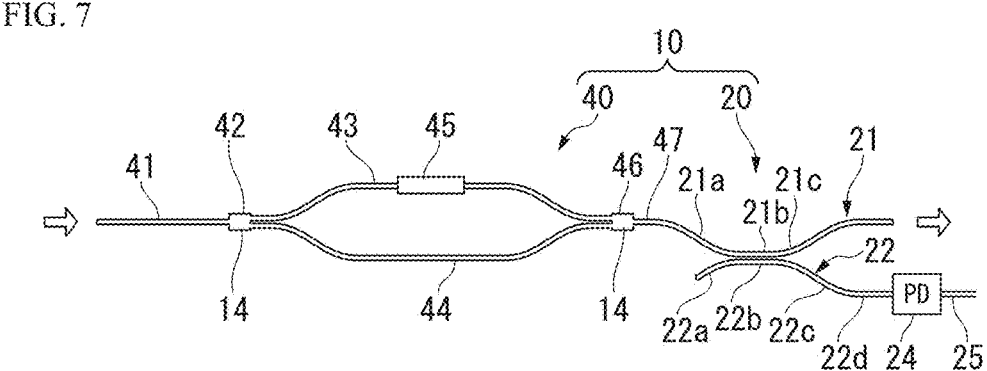
FIG. 7 is a plan view illustrating a sixth embodiment of the optical waveguide device.

FIG. 7 illustrates a sixth embodiment of the optical waveguide device. In the optical waveguide device according to the present embodiment, a photo detector (PD) 24 and an electric wire 25 for ejecting a current from the PD 24 are provided at a front end section 22d of the termination section 22c of the subsidiary waveguide 22 in the mode splitter 20 provided behind the optical coupler section 46 in the Mach-Zehnder optical modulator 40. The installation of the PD 24 enables the monitoring of the light intensity of a light in a high-order mode branched into the subsidiary waveguide 22 and this monitoring enables the detection of, for example, deterioration over time and abnormal operations caused by environmental changes such as temperature changes while the optical waveguide device is in operation.

In other embodiments as well such as a case in which the mode splitter 20 is provided in front of the optical splitter section 42 (refer to FIGS. 3 and 4) or a case in which the mode splitters 20 are provided at the optical waveguides 43 and 44 in the Mach-Zehnder optical modulator 40 (refer to FIG. 5), the PD 24 and the electric wire 25 may be provided at the front end of the termination section 22c of the subsidiary waveguide 22. In the Mach-Zehnder optical modulator 40, it is possible to adjust the operational conditions (for example, in the case of an electrical control, the voltage applied and the like) of the optical modulating unit 45 using a control unit on the basis of results monitored using the PD 24 and thus provide feedback.

Since the PD is preferably disposed on a substrate, the PD may be mounted on the substrate. In a case in which a semiconductor substrate is used, it is also possible to integrate the PD as a semiconductor element on the same substrate together with the optical waveguides. Examples of the PD that can be integrated on a Si substrate including $Si/SiO_2$ waveguides include Group IV semiconductor PDs such as a germanium (Ge) PD, indium phosphide (InP)-based PDs, and PDs of Group III-V compound semiconductor such as gallium arsenide (GaAs).

The required number of the electric wires 25 can be provided in the PD 24 and thus, for example, two electric wires can be provided in parallel to each PD 24 on the substrate (if necessary, through an insulation layer).

In the example of FIG. 7, the termination sections 21c and 22c having a structure in which the subsidiary waveguide 22 and the main waveguide 21 smoothly curve away from each other are provided. The curvature radius at the front end section 22d of the termination section 22c of the subsidiary waveguide gradually increases toward the PD 24 and the waveguide which becomes straight in the end is connected to the PD 24.

In order to increase the amount of a light guided to the monitor PD, it is possible to decrease the bending loss of the high-order-mode light at the termination section 22c of the subsidiary waveguide by increasing the curvature radius at the termination section 22c of the subsidiary waveguide. Particularly, the bending loss can be completely removed by making the termination section 22c of the subsidiary waveguide straight while the curved section in the termination section 21c of the main waveguide 21 remains. In this case, the directional coupler loses the symmetry and thus the removal ratio of the high-order mode from the main waveguide 21 decreases, but it is possible to decrease the bending loss of the split high-order-mode light. In this case, the termination section 22c may be extended along the extended line of the coupling section 22b while the initiation section 22a of the subsidiary waveguide is left to be curved as illustrated in FIG. 7. In addition, it is also possible to curve the termination section 22c of the subsidiary waveguide from the coupling section 22b through a certain position away from the main waveguide 21 and make the termination section straight from the certain position away from the main waveguide 21 through the PD 24 (so as to become diagonal with respect to the extended line of the coupling section 22b).

In a case in which the light-absorbing layer 23 or the PD 24 is provided in the termination section of the subsidiary waveguide 22 as illustrated in FIGS. 6 and 7, the termination section of the subsidiary waveguide 22 is preferably formed to have a substantially constant width until the termination section reaches the light-absorbing layer 23 or the PD 24. Therefore, the light-absorbing layer 23 or the PD 24 can be disposed on a desired position on the substrate and thus the leakage of the high-order-mode light, which is branched into the subsidiary waveguide 22, from the subsidiary waveguide 22 into the substrate can be suppressed.

In a case in which the optical waveguide device includes two or more subsidiary waveguides 22 as illustrated in FIGS. 3, 5, 8A, 8B, and 9, it is possible to provide the light-absorbing layer 23 or the PD 24 at the front end of the termination section of at least one subsidiary waveguide 22. An arbitrary design is possible so that the light-absorbing layer 23 is provided at the front end of the termination section of any subsidiary waveguide 22 and, furthermore, the PD 24 is provided at the front end of the termination section of another subsidiary waveguide 22.

Figure 8A:
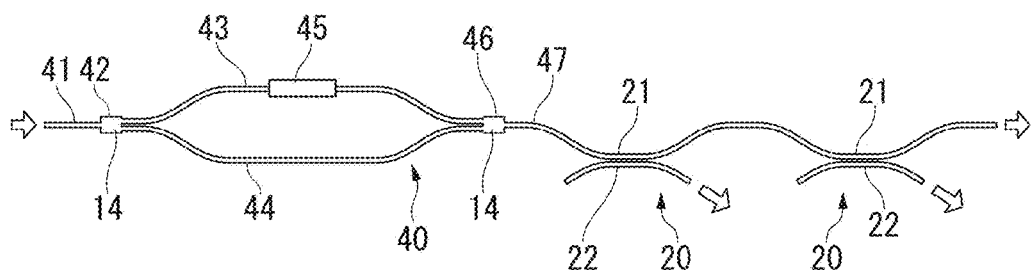
FIG. 8A is a plan view illustrating a seventh embodiment of the optical waveguide device.

FIG. 8A illustrates a seventh embodiment of the optical waveguide device. In the optical waveguide device according to the present embodiment, two or more subsidiary waveguides 22 are provided at different positions in the lengthwise direction of the main waveguide 21 behind the optical coupler section 46, and the width of each subsidiary waveguide 22 is different from the width of the main waveguide 21 in a range of ±10% or less, and is thus substantially the same as the width of the main waveguide 21. The gaps between the subsidiary waveguides 22 and the main waveguide 21 (the gap $w_0$ in FIG. 1D) are equal to each other, the lengths of sections in which the subsidiary waveguide 22 is placed in parallel to the main waveguide 21 (the length $L_0$ of the coupling section 21b or 22b in FIG. 1C) are equal to each other, and thus the mode splitters 20 having the same wavelength characteristics are constituted in sections in which the subsidiary waveguides 22 are placed along the main waveguide 21. Therefore, it is possible to increase the removal ratio of a light (for example, the first-order-mode light) that is supposed to be split into the subsidiary waveguide 22.

Figure 8B:
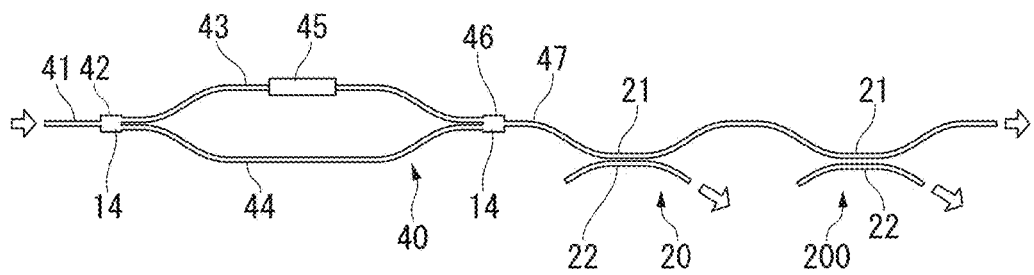
FIG. 8B is a plan view illustrating an eighth embodiment of the optical waveguide device.

FIG. 8B illustrates an eighth embodiment of the optical waveguide device. In the optical waveguide device according to the present embodiment, two or more subsidiary waveguides 22 are provided at different positions in the lengthwise direction of the main waveguide 21 behind the optical coupler section 46, and the width of each subsidiary waveguide 22 is different from the width of the main waveguide 21 in a range of ±10% or less, and is substantially the same as the width of the main waveguide 21. The gaps between the subsidiary waveguides 22 and the main waveguide 21 are different from each other, the lengths of sections in which the subsidiary waveguide 22 is placed in parallel to the main waveguide 21 are different from each other, and thus mode splitters 20 and 200 having different wavelength characteristics are formed in sections in which the subsidiary waveguides 22 are placed along the main waveguide 21. Therefore, it is possible to broaden a wavelength range in which a light (for example, the first-order-mode light) that is supposed to be split into the subsidiary waveguide 22 is removed. For example, in the example of FIG. 8B, compared with the mode splitter 20, the mode splitter 200 has a broader gap between the subsidiary waveguide 22 and the main waveguide 21, but the present invention is not particularly limited thereto.

In the examples of FIGS. 8A and 8B, two or more subsidiary waveguides 22 are provided at different positions in the lengthwise direction of the main waveguide 21 behind the optical coupler section 46. However, in other embodiments as well such as a case in which the mode splitter 20 is provided in front of the optical splitter section 42 (refer to FIGS. 3 and 4) or a case in which the mode splitters 20 are provided at the optical waveguides 43 and 44 in the Mach-Zehnder optical modulator 40 (refer to FIG. 5), similarly, it is possible to provide two or more subsidiary waveguides 22 at different positions in the lengthwise direction of the main waveguide 21. Even in this case as well, the width of each subsidiary waveguide 22 is preferably different from the width of the main waveguide 21 only in a range of ±10% or less. In a case in which a plurality of mode splitters 20 having the same wavelength characteristics is constituted, it is possible to increase the removal ratio of a light (for example, the first-order-mode light) that is supposed to be split into the subsidiary waveguide 22. In a case in which a plurality of mode splitters 20 and 200 having different wavelength characteristics is constituted, it is possible to broaden a wavelength range removed into the subsidiary waveguide 22.

Figure 9:
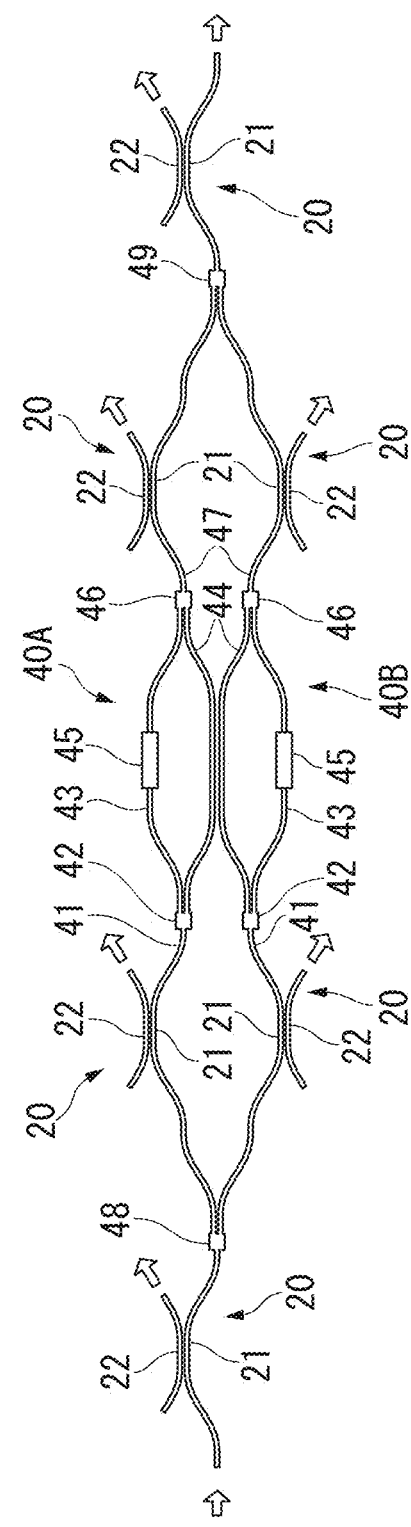
FIG. 9 is a plan view illustrating a ninth embodiment of the optical waveguide device.

FIG. 9 illustrates a ninth embodiment of the optical waveguide device. The optical waveguide device according to the present embodiment includes a plurality of Mach-Zehnder optical modulators 40A and 40B. In these Mach-Zehnder optical modulators 40A and 40B, the optical waveguide device includes a plurality of Mach-Zehnder optical modulators 40A and 40B. A 1×2 (1 input and 2 output) optical splitter section 48 is disposed in front of the Mach-Zehnder optical modulators 40A and 40B so that a light injected into the optical splitter section 48 is split into two lights, and the lights are injected into separate Mach-Zehnder optical modulators 40A and 40B respectively. Furthermore, a 2×1 (2 input and 1 output) optical coupler section 49 is disposed behind the Mach-Zehnder optical modulators 40A and 40B so that the main forces of the respective Mach-Zehnder optical modulators 40A and 40B can be coupled and output. As described above, even in constitutions in which a plurality of Mach-Zehnder optical modulators 40A and 40B is included in one Mach-Zehnder interferometer constituted of the optical splitter section 48 and the optical coupler section 49, the mode splitter 20 according to each embodiment of the present invention described above can be provided.

Figure 10:
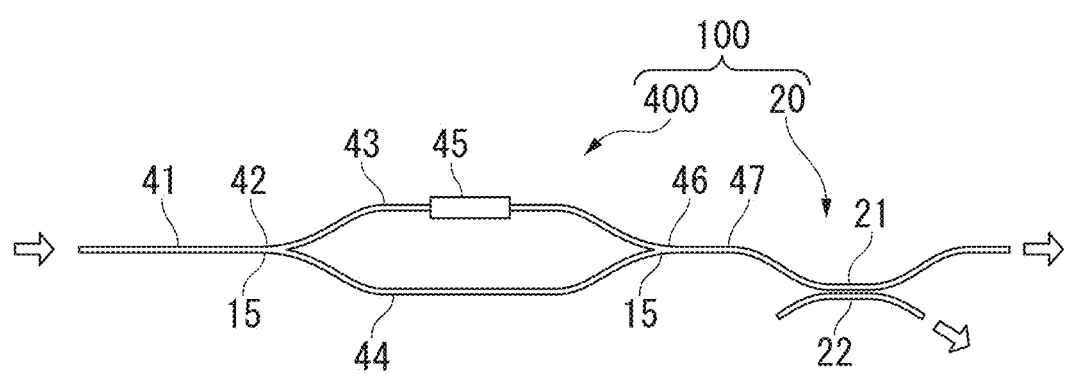
FIG. 10 is a plan view illustrating a tenth embodiment of the optical waveguide device.

FIG. 10 illustrates a tenth embodiment of the optical waveguide device. The optical waveguide device 100 according to the present embodiment is constituted in the same manner as the optical waveguide device 10 of FIG. 1A except for the fact that an Y-type coupler/splitter 15 is provided as the coupler/splitter used in the optical splitter section 42 and the optical coupling unit 46 in the Mach-Zehnder optical modulator 400. In addition, in other embodiments as well such as the optical waveguide devices illustrated in FIGS. 2A to 9, the Y-type coupler/splitter 15 can be used in place of the MMI-type coupler/splitter 14.

EXAMPLES

Hereinafter, the present invention will be specifically described using examples. In addition, the present invention is not limited only to these examples.

Example 1

In an optical waveguide, an optical splitter section, and an optical coupler section, cladding regions were formed of $SiO_2$ and core regions were formed of Si.

The thickness of the waveguide core region (refer to $t_0$ in FIG. 1D) was set to 220 nm and the widths of the waveguide core region (refer to $w_1$ and $w_2$ in FIG. 1D) were set to 500 nm. Claddings were provided on and below the core so as to prevent lights from coming into contact with a substrate and the air. The thicknesses of the claddings (refer to $t_1$ and $t_2$ in FIG. 1D) were set to 2 μm on and below the core. Claddings were also formed at the side of the core and between the waveguides.

Figure 11A:
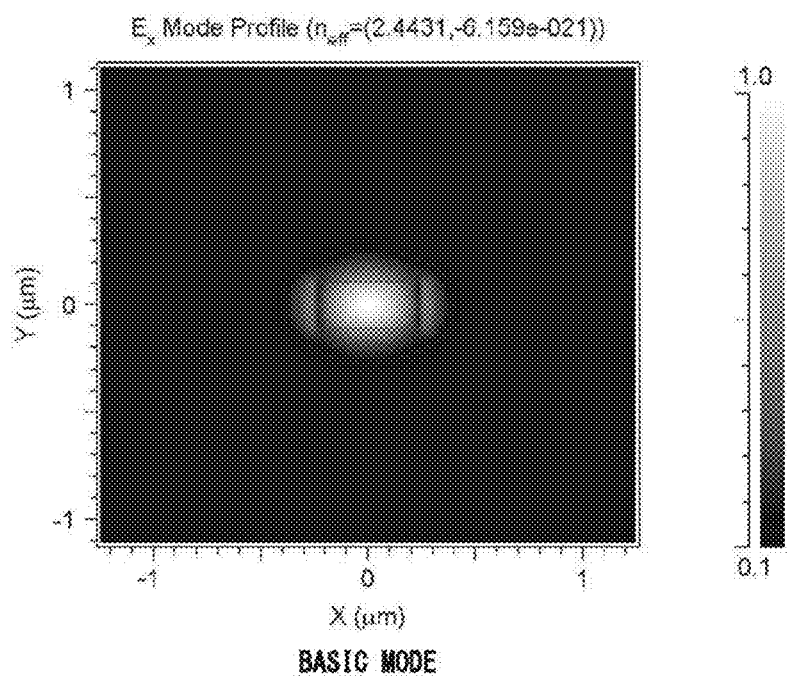
FIG. 11A is a simulation result illustrating an example of a space distribution of an Ex electric field of a basic mode.
Figure 11B:
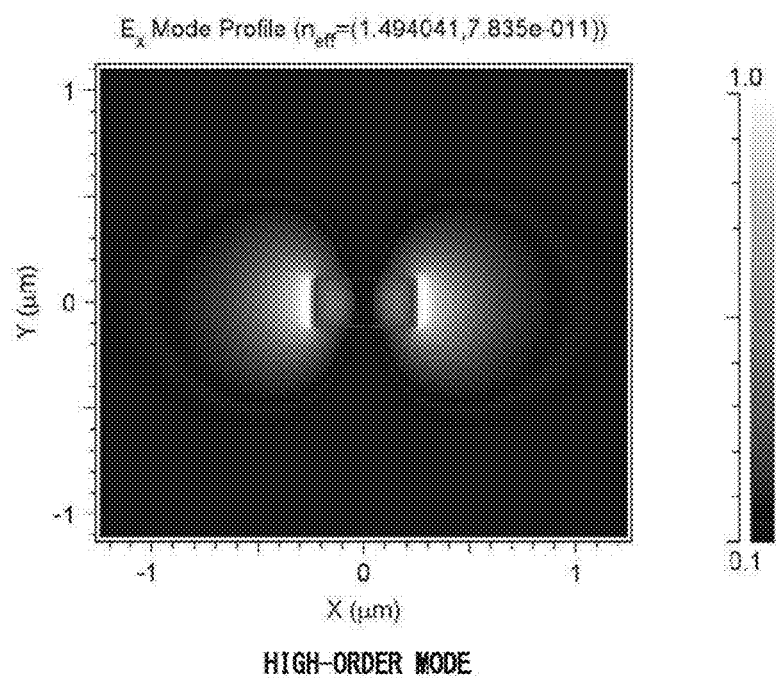
FIG. 11B is a simulation result illustrating an example of a space distribution of an Ex electric field of a first-order mode.

The electromagnetic field distribution of the basic mode and the first-order mode with one optical waveguide solely disposed was analyzed through simulation. The analysis results of the electromagnetic distribution are illustrated in FIGS. 11A and 11B. It was found that, while lights propagated through the center of the core in the basic mode illustrated in FIG. 11A, lights propagated outside the waveguide in the high-order mode illustrated in FIG. 11B compared with in the basic mode.

An MMI coupler/splitter was used as the optical coupler section and the optical splitter section in the Mach-Zehnder optical modulator. The width of the MMI coupler/splitter (refer to $W_{MMI}$ in FIG. 1B) was set to 1.5 μm, and the length (refer to $L_{MMI}$ in FIG. 1B) was set in a range of 1.7 μm to 1.9 μm. In addition, one end of the MMI splitter was coupled to one waveguide and the other end was coupled to two waveguides.

The waveguide in front (incidence side) of the optical splitter section was used as a main waveguide and a subsidiary waveguide was placed in parallel with the main waveguide with a gap therebetween. In order to make the maximum transfer power to the subsidiary waveguide closer to 100% as much as possible, the waveguide width of the subsidiary waveguide was set to be equal to the width of the main waveguide. When the gap (waveguide gap) between the main waveguide and the subsidiary waveguide decreases, the coupling of the basic mode from the main waveguide to the subsidiary waveguide becomes strong and the loss of the basic-mode light increases. Conversely, when the subsidiary waveguide is excessively away from the main waveguide, the coupling of the first-order mode from the main waveguide to the subsidiary waveguide becomes weak and an extremely long bypass length is required.

In order to obtain the waveguide gap, in a directional coupler in which two optical waveguides were disposed, the coupling coefficient was computed from the results of mode analysis through the finite element method and, furthermore, the coupling length was calculated from the coupling coefficient. The waveguide gap was set in a range of 0.15 μm to 0.85 μm every 0.05 μm. This setting was applied to all the mode analyses of FIGS. 12 to 15.

Figure 12:
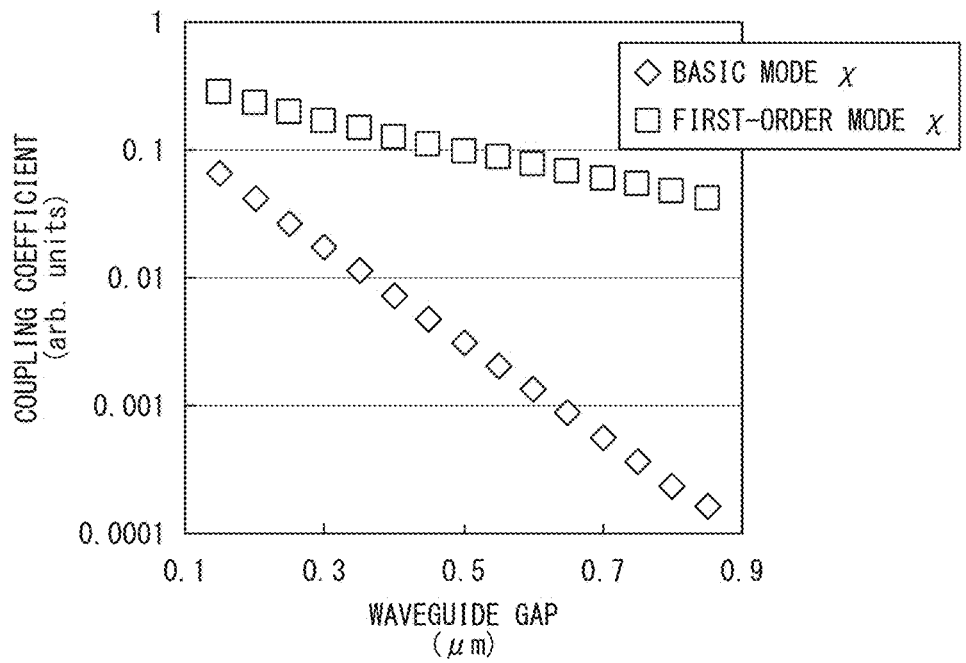
FIG. 12 is a graph illustrating an example of a relationship between a coupling coefficient and a waveguide gap.

The result of the relationship between the coupling coefficient and the waveguide gap is illustrated in FIG. 12. It was found that, when the waveguide gap was increased, both coupling coefficients χ of the basic mode and the first-order mode decreased, but the coupling coefficient χ of the basic mode decreased more abruptly than the coupling coefficient χ of the first-order mode.

Figure 13:
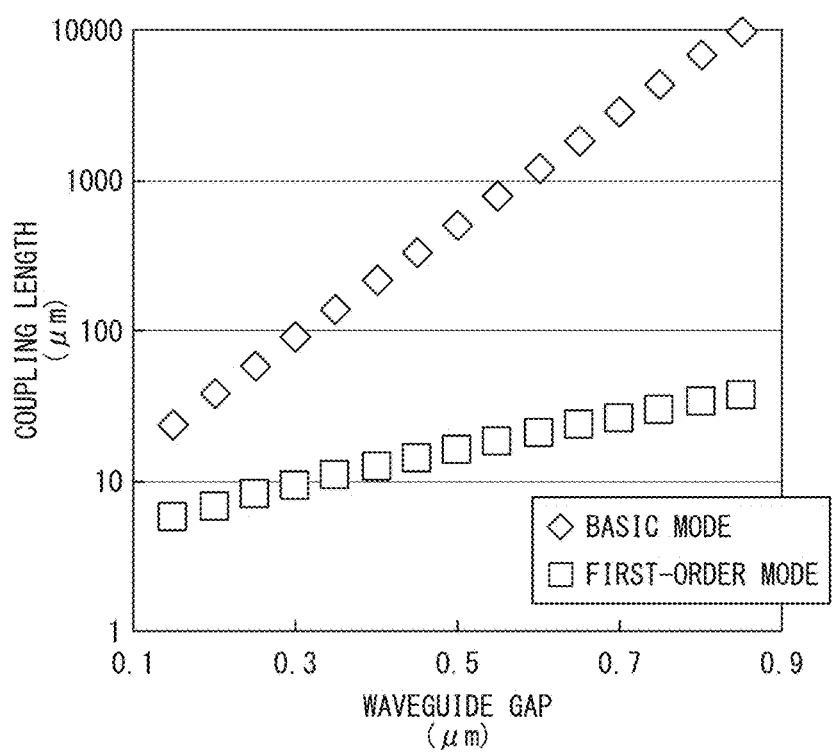
FIG. 13 is a graph illustrating an example of a relationship between a coupling length and a waveguide gap.

The result of the relationship between the coupling length and the waveguide gap is illustrated in FIG. 13. When the waveguide gap was set to 0.5 μm, the coupling length of the basic mode was 504 μm, but the coupling length of the first-order mode was 16 μm. Since the coupling efficiency and coupling length between the basic mode and the first-order mode were determined by the waveguide gap, the length (bypass length) of a section in which the subsidiary waveguide was in parallel with the main waveguide was set to be equal to the coupling length of the first-order mode. When it is assumed that the main waveguide and the subsidiary waveguide are symmetric to each other, the bypass length being set to be equal to the coupling length of the first-order mode enables 100% of the first-order-mode light to be transferred to the subsidiary waveguide. In addition, the proportion of the basic-mode light transferred to the subsidiary waveguide at this time remains at a transfer of $\sin^2(\pi/2\times16/504)=0.0025$, that is, 0.25%. That is, in this case, it is possible to fully split the first-order mode with a loss of the basic-mode light of 0.01 dB.

Figure 14:
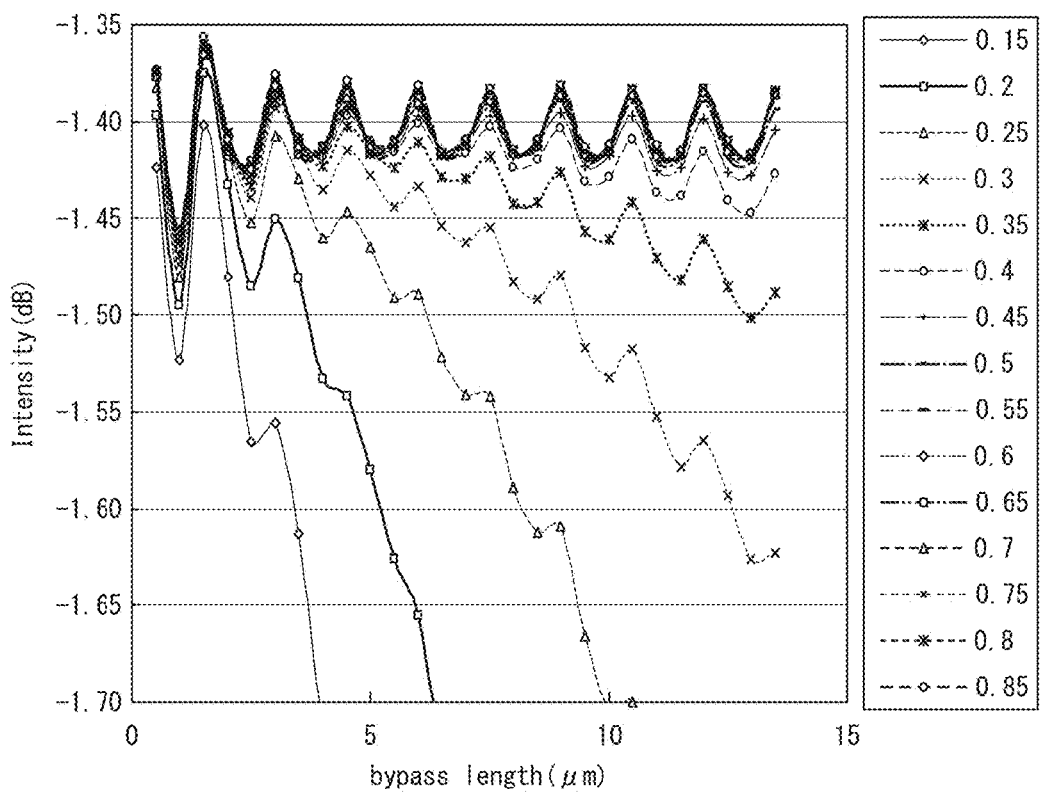
FIG. 14 is a graph illustrating an example of a relationship between an intensity of a basic-mode light and a bypass length in a plurality of optical waveguide gaps.
Figure 15:
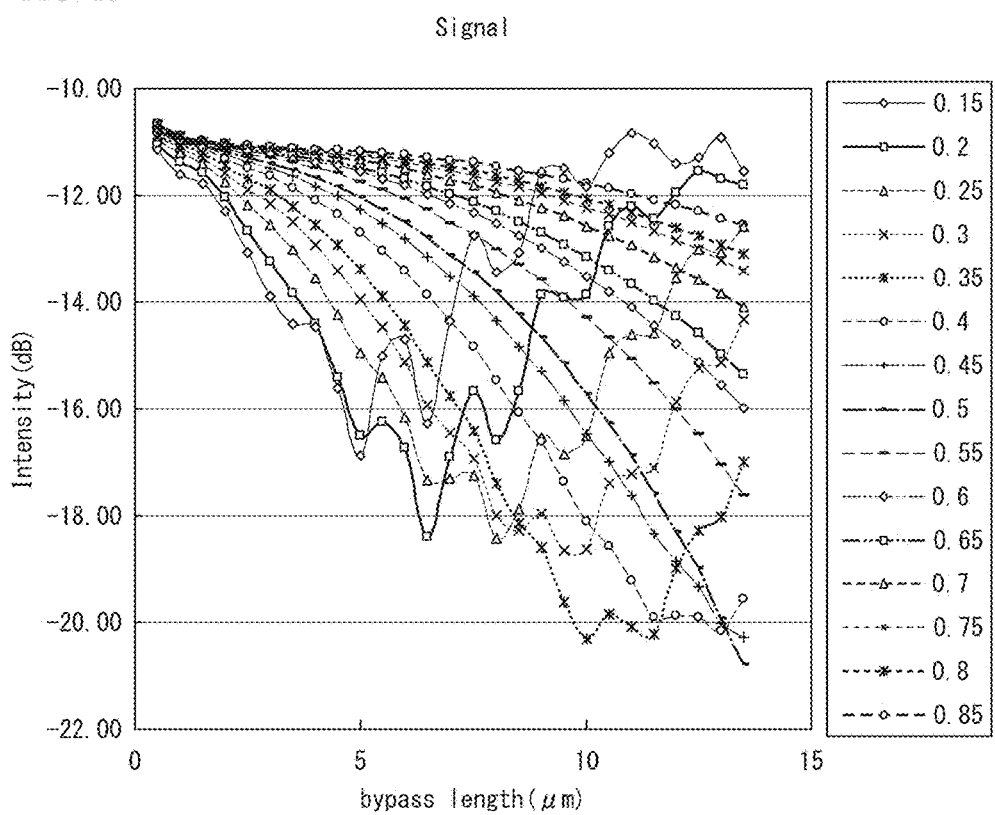
FIG. 15 is a graph illustrating an example of a relationship between an intensity of a first-order-mode light and a bypass length in a plurality of optical waveguide gaps.

Furthermore, in order to study the above-described bypass length, electromagnetic field simulation was carried out using the finite-difference time domain (FDTD) method. The wavelength of the light was set to 1.55 μm which is a generally-used wavelength in optical communication. The main waveguide had a straight shape and a curved section was provided in the subsidiary waveguide. In FIGS. 14 and 15, the correspondence between individual data series (marker-attached broken lines) and the waveguide gaps (0.15 to 0.85 µm) is provided along the right pole of the graph.

A case in which a basic-mode light was injected into the mode splitter in the front section of the MMI-type splitter was assumed and the relationship between the intensity of the basic-mode light and the bypass length at a plurality of waveguide gaps was obtained. The results are illustrated in FIG. 14. In FIGS. 14 and 15, numerical values provided along the right pole indicate the waveguide gaps (µm). From these results, it was found that, at a waveguide gap of 0.4 µm or less, lights in the basic mode were strongly coupled to the subsidiary waveguide and a great waveguide loss occurred.

Conversely, a case in which a first-order-mode light was injected into the mode splitter in the front section of the MMI-type splitter was assumed and the relationship between the intensity of the first-order-mode light and the bypass length at a plurality of waveguide gaps was obtained. The results are illustrated in FIG. 15. From these results, it was found that, when the waveguide gap was narrow, the coupling coefficient was great, the maximum transfer point of the light was obtained due to the short bypass length and then the light returned to the main waveguide from the subsidiary waveguide.

The coupling length of the first-order mode confirmed from FIG. 15 is almost equal to the coupling length illustrated in FIG. 13 which is calculated using the finite element method.

The small maximum power transfer efficiency at a short bypass length is considered to result from the influence of the asymmetry of the subsidiary waveguide between the initiation point and the termination point. When the waveguide gap is wide, the coupling becomes weak and no transfer to the subsidiary waveguide is observed as long as the bypass length is not increased.

As described above, since the loss of the basic-mode light is great at a waveguide gap of 0.4 µm or less, it is considered that the waveguide gap is preferably greater than 0.4 µm.

Therefore, in Example 1, the waveguide gap (refer to $w_0$ in FIG. 1D) was set to 0.5 µm (500 nm) and the bypass length was set to 16 µm. When the first-order-mode light was injected, the amount of the light remaining in the main waveguide with respect to the light transferred to the subsidiary waveguide was −12.5 dB. When the basic-mode light was injected, the amount of the light transferred to the subsidiary waveguide with respect to the light remaining in the main waveguide was −25 dB.

Figure 16:
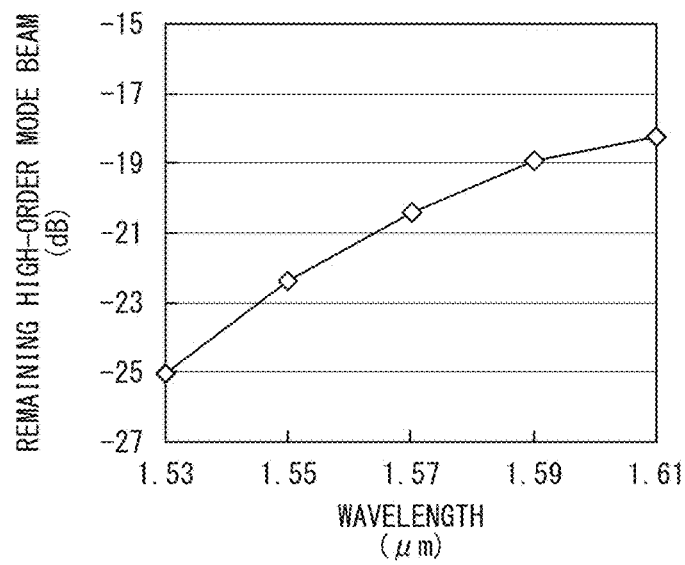
FIG. 16 is a graph illustrating an example of a wavelength dependency of power of the first-order-mode light right in front of an optical splitter.

In the optical splitter of Example 1, since the directional coupler was used as the front mode splitter, a change in characteristics caused by a wavelength change was verified. The wavelength dependency of the power of the first-order-mode light right in front of the optical splitter was calculated by changing the incidence wavelength under the above-described conditions (the waveguide gap: 0.5 µm and the bypass length: 16 µm). The results (wavelength: 1.53 to 1.61 µm) are illustrated in FIG. 16. It was found that, in the long wavelength side, while a decrease in the removal ratio of the first-order-mode light by the subsidiary waveguide was observed, the first-order-mode light was removed until the amount of the remaining high-order-mode light reached −18 dB or less and there was a first-order-mode light removal effect throughout a C-band and an L-band.

Figure 17:
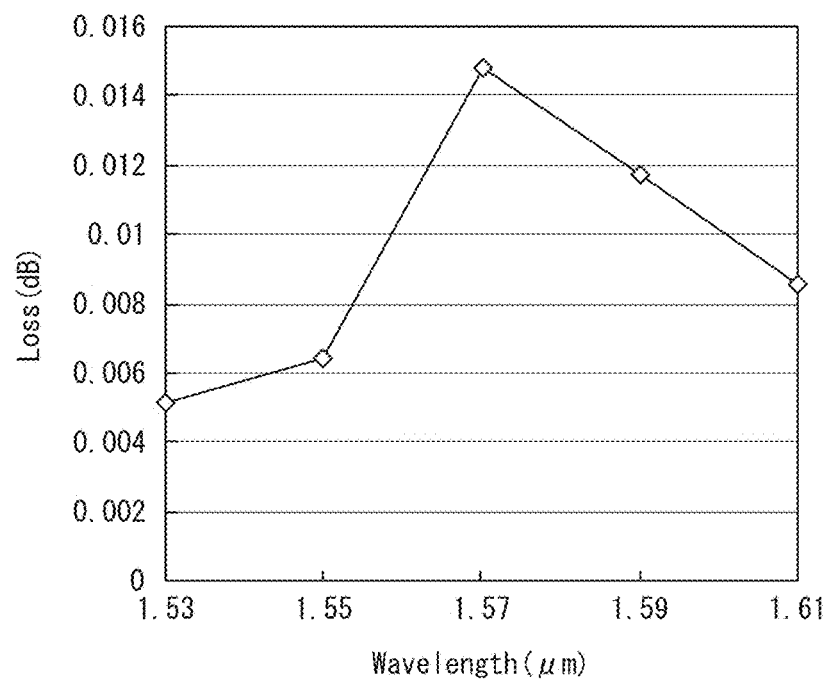
FIG. 17 is a graph illustrating an example of a wavelength dependency of loss of the basic-mode light.

Furthermore, the loss of the basic-mode light by the provision of the subsidiary waveguide in Example 1 was calculated. The results (wavelength: 1.53 to 1.61 µm) are illustrated in FIG. 17. The loss of the basic-mode light was 0.016 dB or less throughout the C-band and the L-band, which is not considered to cause any practical problems.

In order to prevent the first-order light transferred to the subsidiary waveguide from returning to the main waveguide, a curved section that smoothly separated from the main waveguide was provided at the termination section of the subsidiary waveguide. When the curvature radius of the curve section is small, the first-order light leaks from the subsidiary waveguide and there is a possibility that the first-order light may be recoupling to the main waveguide through the cladding.

Therefore, the curvature radius of the curved section was set to 100 µm in order to decrease the leakage of the first-order-mode light.

Figure 18:
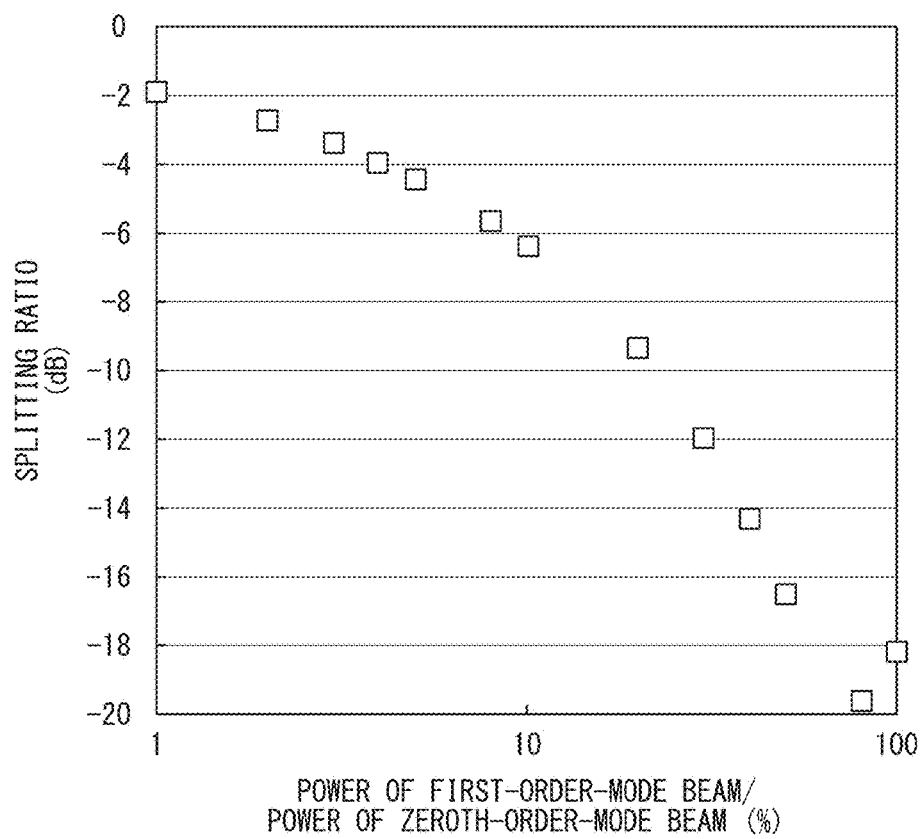
FIG. 18 is a graph illustrating an example of a change in a splitting ratio of the optical splitter through removal of the first-order mode.

The change in the splitting ratio of the MMI-type splitter by the removal of the first-order mode was studied through electromagnetic field simulation using the (above-described) FDTD method. First, the appearance of the changes in the splitting ratio in a case in which the basic-mode light and the first-order-mode light are injected into the MMI-type splitter at a variety of ratios is illustrated in FIG. 18.

In the case of the MMI-type splitter including no mode splitter, when only 2% of the first-order-mode light was injected, the power of the left arm with respect to the right arm from the splitter reached −2.77 dB.

On the other hand, in the case of the MMI-type splitter including the mode splitter optimized in Example 1 (the waveguide gap: 0.5 µm and the bypass length: 16 µm), the splitting ratio at both arms was improved up to 0.24 dB. The difference in the splitting ratio caused by the presence or absence of the above-described mode splitter means that the extinction ratio is improved from 5.58 dB to 15.5 dB when it is considered that a decrease in the extinction ratio is only caused by the unequal splitting ratio of the MMI optical splitter. Therefore, when the mode splitter is provided in front of the splitter section in the Mach-Zehnder optical modulator, a significant improvement in the splitting ratio can be anticipated.

Example 2

In Example 2 as well, the same optical waveguide structure as in Example 1 was employed. Specifically, the material of the cladding was $SiO_2$, the material of the core was Si, the thickness of the core was 220 nm, the width of the core (waveguide width) was 500 nm, and the thicknesses of the cladding on the core and below the core were 2 µm.

Figure 19:
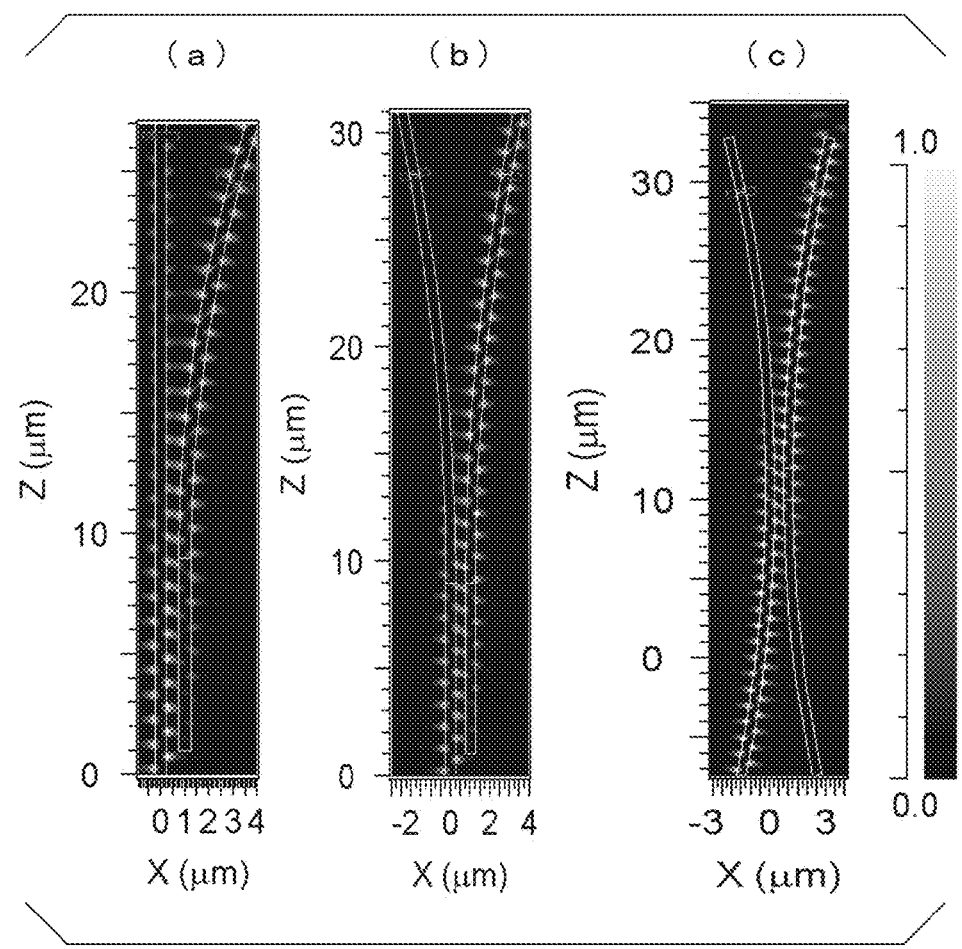
FIG. 19 is a simulation result illustrating an example of an appearance of propagation of the first-order-mode light in a variety of mode splitters.

The planar shape of the mode splitter was studied through electromagnetic filed simulation using the (above-described) FDTD method. First, the appearance of the propagation of lights in a case in which first-order lights were injected into the mode splitter is illustrated in FIG. 19. A part (a) of FIG. 19 illustrates a mode splitter having a structure in which the main waveguide (on the left side in the drawing) is straight and the subsidiary waveguide (on the right side in the drawing) smoothly curves away from the main waveguide in the termination section. A part (b) of FIG. 19 illustrates a mode splitter having a structure in which the main waveguide and the subsidiary waveguide smoothly curves away from each other in the respective termination sections. FIG. 19C illustrates a mode splitter having a structure in which the main waveguide and the subsidiary waveguide smoothly curve toward each other in the initiation sections and smoothly curves away from each other in the respective termination sections.

While the first-order-mode light is transferred to the subsidiary waveguide in any mode splitters, in detail, as described below, in the part (a) of FIG. 19, the first-order-mode light remaining in the main waveguide is observed, although not much; in the part (b) of FIG. 19, the amount of the first-order-mode light remaining in the main waveguide is small, and, in a part (b) of FIG. 19, no first-order-mode light remaining in the main waveguide can be observed.

Figure 20:
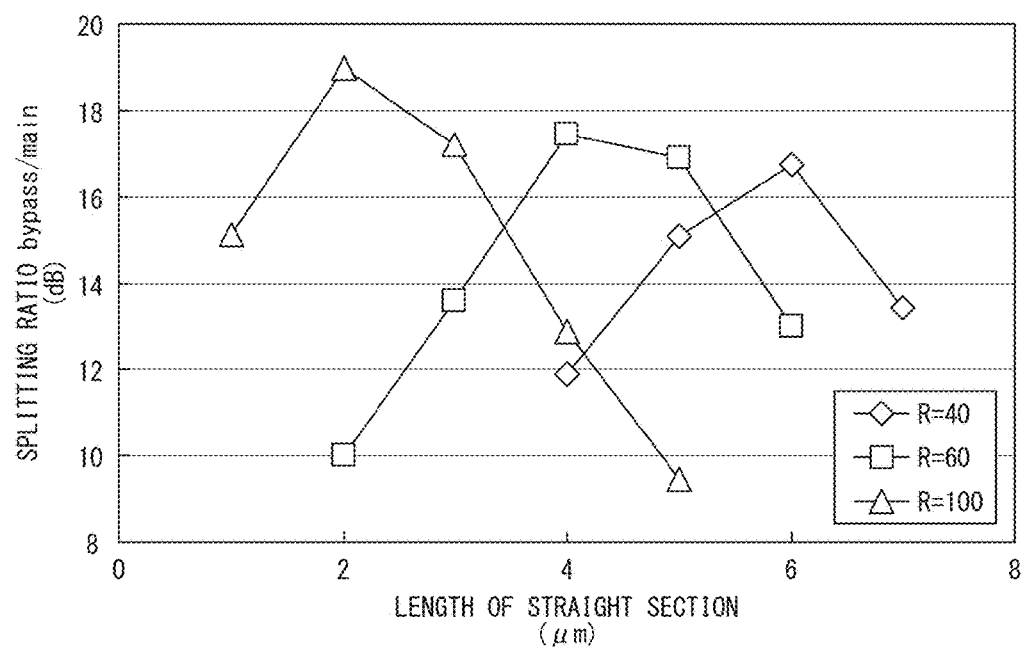
FIG. 20 is a graph illustrating an example of a relationship between the splitting ratio and a straight section at a plurality of curvature radii.

FIG. 20 illustrates the study results of how the splitting ratio varies with the length of the straight section that is in parallel with the main waveguide and the subsidiary waveguide in the structure illustrated in the part (c) of FIG. 19. Here, the splitting ratio refers to a value of the ratio between the power of the first-order-mode light transferred to the subsidiary waveguide and the powder of the first-order-mode light remaining in the main waveguide expressed using decibel (dB).

The curvature radius of the curved section provided in front of the straight section which served as the directional coupler was set to 40 µm, 60 µm, and 100 µm. In the graph of FIG. 20, the respective curvature radii are indicated as "R=40", "R=60", and "R=100".

As a result, it was indicated that, in a case in which the curvature radius of the curved section was set to be great, the splitting ratio (the maximum value of the splitting ratio at each folded line) when the length of the straight section was optimized tended to improve. While no specific results are described herein, according to the present inventors' studies, even in the structures illustrated in parts (a) and (b) of FIG. 19, it was confirmed that, similarly, in a case in which the curvature radius of the curved section was increased, the splitting ratio when the length of the straight section was optimized improved.

Figure 21:
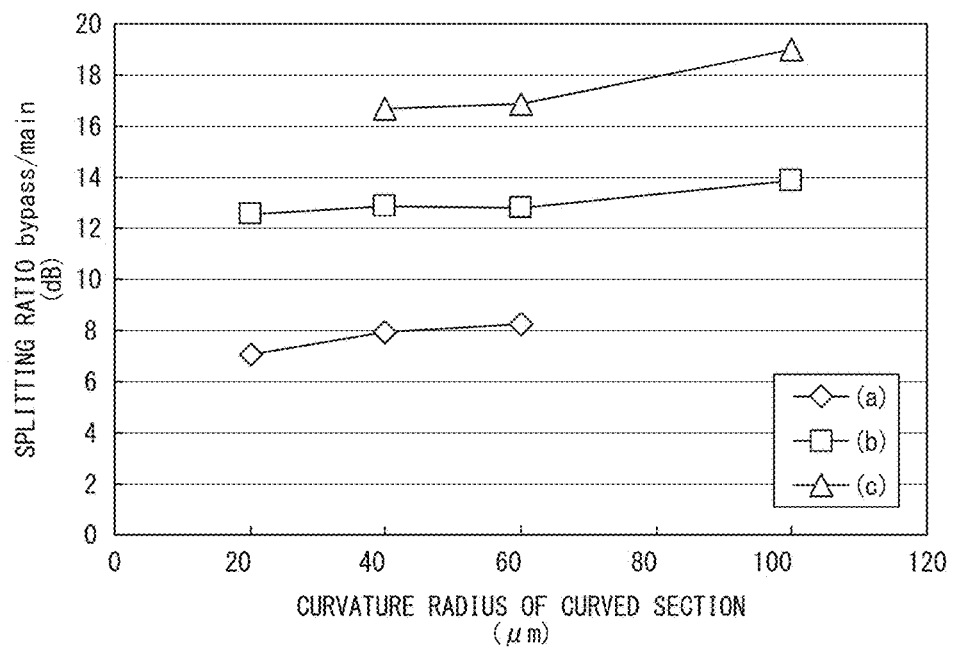
FIG. 21 is a graph illustrating an example of a relationship between the splitting ratio and a curvature radius of a curved section.

FIG. 21 illustrates the study results of the relationship between the optimized splitting ratio and the curvature radius of the curved section for the three structures illustrated in parts (a), (b), and (c) of FIG. 19. As the curvature radii of the curved section, 3 to 4 radii were selected from 20 µm, 40 µm, 60 µm, and 100 µm. The results showed that the splitting ratio improved in an order of the structure in the part (c), the structure in the part (b), and the structure in the part (a).

The "optimized splitting ratio" herein refers to the splitting ratio when the length of the straight section is optimized in each structure. Therefore, the splitting ratio illustrated in a part (c) of FIG. 21 is the same value as the "optimized splitting ratio" illustrated in FIG. 20.

Figure 22:
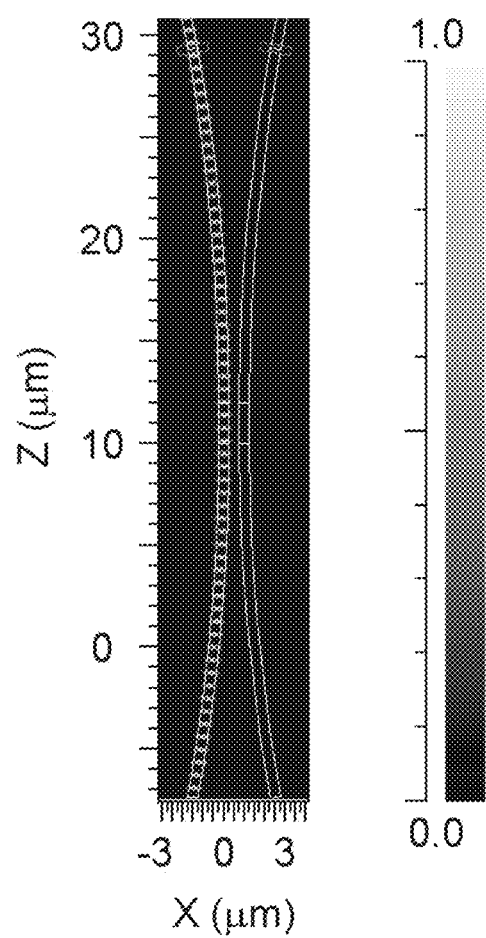
FIG. 22 is a simulation result illustrating an example of an appearance of propagation of the basic-mode light in the mode splitter.

On the basis of the above-described studies illustrated in FIGS. 19 to 21, in the part (c) of FIG. 19C, the appearance of the propagation of the basic-mode light in the mode splitter in which the length of the straight section was set to 2 µm and the curvature radius of the curved section was set to 100 µm was studied. The results are illustrated in FIG. 22. In these results, the basic-mode light transferred to the subsidiary waveguide was not observed, and the basic-mode light all propagated through the main waveguide. In particular, the splitting ratio (loss) was −30.5 dB and the loss was extremely low.

Example 3

Waveguides and a coupler/splitter were constituted using $SiO_2$ for the cladding region and Si for the core region. The thickness of the core was set to 220 nm and the width of the core (waveguide width) was set to 500 nm. Claddings were provided on and below the core so as to prevent lights from coming into contact with a substrate and the air. The thicknesses of the claddings were set to 2 µm on and below the core. Claddings were also formed at the side of the core and between the waveguides.

An MMI coupler/splitter was used as the optical coupler section and the optical splitter section in the Mach-Zehnder optical modulator. The width $W_{MMI}$ of the coupler/splitter was set to 1.5 µm, and the length $L_{MMI}$ was set to 1.8 µm. In a position on a single side of the coupler/splitter in which two optical waveguides are coupled to each other, the gap between the parallel waveguides was set to 0.3 µm.

The waveguide behind (ejection side) the optical coupler section was used as the main waveguide and a subsidiary waveguide was placed in parallel with the main waveguide with a gap therebetween (refer to FIG. 1A). In order to make the maximum transfer power to the subsidiary waveguide closer to 100% as much as possible, the waveguide width of the subsidiary waveguide was set to be equal to the width of the main waveguide. On the basis of the studies of Examples 1 and 2, the gap between the subsidiary waveguide and the main waveguide was set to 0.5 µm (500 nm).

When the main waveguide and the subsidiary waveguide curve toward and curve away from each other, an abrupt change causes the fluctuation of the guided light and loss degradation. Therefore, the main waveguide and the subsidiary waveguide preferably smoothly curve toward and curve away from each other. However, lights in the high-order mode are coupled, although weakly, even in sections in which the two waveguides curve toward and curve away from each other, and thus it is not appropriate that the main waveguide and the subsidiary waveguide excessively smoothly curve toward and curve away from each other. Therefore, on the basis of the studies of Example 2, as illustrated in the part (c) of FIG. 19 and FIG. 22, for each of the main waveguide and the subsidiary waveguide, the curvature radii of the sections in which the two waveguides curve toward and curve away from each other are set to 100 µm and the length of the straight section is set to 2 µm. Therefore, it is possible to efficiently transfer lights in the high-order mode from the main waveguide to the subsidiary waveguide and, furthermore, rarely transfer lights in the basic mode.

Example 4

Waveguides and a coupler/splitter were constituted using $SiO_2$ for the cladding region and Si for the core region. The thickness of the core was set to 220 nm and the width of the core (waveguide width) was set to 600 nm. Claddings were provided on and below the core so as to prevent lights from coming into contact with a substrate and the air. The thicknesses of the claddings were set to 2 µm on and below the core. Claddings were also formed at the side of the core and between the waveguides.

An MMI coupler/splitter was used as the optical coupler section and the optical splitter section in the Mach-Zehnder optical modulator.

The width $W_{MMI}$ of the coupler/splitter was set to 1.7 µm, and the length $L_{MMI}$ was set to 2.4 µm. In a position on a single side of the coupler/splitter in which two optical waveguides are coupled to each other, the gap between the parallel waveguides was set to 0.3 µm.

The waveguide behind (ejection side) the optical coupler section was used as the main waveguide and a subsidiary waveguide was placed in parallel with the main waveguide with a gap therebetween (refer to FIG. 1A).

Similar to Examples 1 to 3, as a result of studying the optimal waveguide gap even with a waveguide width of 600 nm, the gap between the main waveguide and the subsidiary waveguide was set to 0.5 μm (500 nm). In addition, as illustrated in the part (c) of FIG. 19 and FIG. 22, for each of the main waveguide and the subsidiary waveguide, when the curvature radii of the sections in which the two waveguides curve toward and curve away from each other were set to 100 μm, the optimal length of the straight section was obtained to be 9 μm through simulation.

Therefore, it is possible to efficiently transfer lights in the high-order mode from the main waveguide to the subsidiary waveguide and, furthermore, rarely transfer lights in the basic mode.

Example 5

The same subsidiary waveguide as in Examples 3 and 4 was disposed in front (incidence side) of the optical splitter section instead of behind the optical coupler section in the Mach-Zehnder optical modulator (refer to FIG. 4).

In addition, the same subsidiary waveguides as in Examples 3 and 4 were disposed both in front of the optical splitter section and behind the optical coupler section in the Mach-Zehnder optical modulator (refer to FIG. 3).

Furthermore, the same subsidiary waveguide as in Examples 3 and 4 was disposed inside the Mach-Zehnder optical modulator (refer to FIG. 5).

DESCRIPTION OF THE REFERENCE NUMERALS

1 . . . Substrate, 2 . . . Core, 3 . . . Cladding, 10, 100 . . . Optical Waveguide Device, 14, 15 . . . Optical Coupler/Splitter, 20, 20A, 30, 30A, 200 . . . Mode Splitter, 21 . . . Main Waveguide, 22 . . . Subsidiary Waveguide, 23 . . . Light-Absorbing Layer, 24 . . . Photo Detector (PD), 25 . . . Electric Wire, 40, 401A, 40B, 400 . . . Mach-Zehnder Optical Modulator, 42, 48 . . . Optical Splitter Section, 45 . . . Optical Modulating Unit, 46, 49 . . . Optical Coupler Section

The invention claimed is:

1. An optical waveguide device comprising:
an optical coupler section which couples two input beams into one output beam; and
a mode splitter which includes a main waveguide in which beams are configured to be propagated in at least two propagation modes with different propagation orders and a subsidiary waveguide which includes a coupling section disposed in parallel with the main waveguide at a certain distance away from the main waveguide so as to constitute a directional coupler and is configured to split at least one propagation mode out of the two or more propagation modes from the main waveguide, the mode splitter being provided in a front section which is on an input side of the optical coupler section, wherein
$n_{core}/n_{cladding}$ which is a refractive index ratio between a core and a cladding which constitute the main waveguide and the subsidiary waveguide is in a range of 101% to 250%,
the mode splitter is provided in both of two waveguides in the front section of the optical coupler section,
a phase modulator is provided in a front section of one of the mode splitters,
a waveguide, which is connected to the input side of the optical coupler section from the main waveguide, is a multi-mode waveguide which guides a beam in a multi-mode, the subsidiary waveguide is configured to split high-order modes from the main waveguide, and
wherein a light-absorbing layer doped with impurities is provided in a termination section of the subsidiary waveguide.

2. The optical waveguide device according to claim 1, wherein
another mode splitter is further provided in a rear section which is on an output side of the optical coupler section.

3. The optical waveguide device according to claim 1, wherein
two input-side waveguides and an output-side waveguide, which are connected to the optical coupler section, are multi-mode waveguides which guide a beam in a multi-mode.

4. The optical waveguide device according to claim 1, further comprising:
a Mach-Zehnder optical modulator constituted of an optical splitter section which splits one input beam into two split beams and the optical coupler section, wherein
in the Mach-Zehnder optical modulator, the mode splitter is disposed in at least one of the rear section of the optical coupler section and inside the Mach-Zehnder optical modulator which is between the optical splitter section and the optical coupler section.

5. The optical waveguide device according to claim 1, further comprising:
an optical splitter section which splits one input beam into two split beams and is provided in a front section which is on an input side of the optical coupler section, wherein
first output beam from the optical splitter section is input to the optical coupler section through a waveguide having the phase modulator, and second output beam from the optical splitter section is input to the optical coupler section through a waveguide having no phase modulator.

6. The optical waveguide device according to claim 1, wherein the coupler section is an MMI-type optical coupler.

7. The optical waveguide device according to claim 1, wherein the coupler section is a Y-type coupler/splitter.

8. The optical waveguide device according to claim 1, further comprising:
a photo detector and an electric wire for ejecting a current from the photo detector which are disposed at a front end of the termination section of the subsidiary waveguide.

9. The optical waveguide device according to claim 1, wherein the subsidiary waveguide further comprises an initiation section, extending from an input end of the subsidiary waveguide to the coupling section of the subsidiary waveguide, a termination section, extending from the coupling section of the subsidiary waveguide to an output end of the subsidiary waveguide, wherein the initiation section is substantially symmetrical to the termination section with respect to the coupling section, and the initiation section smoothly curves toward the main waveguide as the initiation section curves from the input end of the subsidiary waveguide toward the coupling section of the subsidiary waveguide.

10. An optical waveguide device comprising:
an optical coupler section which couples two input beams into one output beam; and
a mode splitter which includes a main waveguide in which beams are configured to be propagated in at least two propagation modes with different propagation orders and a subsidiary waveguide which includes a coupling section disposed in parallel with the main waveguide at a certain distance away from the main waveguide so as to constitute a directional coupler and is configured to split at least one propagation mode out of the two or more propagation modes from the main waveguide, the mode splitter being provided in a rear section which is on an output side of the optical coupler section; and a phase modulator which is provided in a front section which is on an input side of the optical coupler section, wherein $n_{core}/n_{cladding}$ which is a refractive index ratio between a core and a cladding which constitute the main waveguide and the subsidiary waveguide is in a range of 101% to 250%, in a case in which two input beams are in phase, a coupled beam of the two input beams propagates through an optical waveguide in a rear section of the coupling section in a basic mode, and the optical signal changes into an ON state, in a case in which two input beams are in opposite phase, the coupled beam propagates through the optical waveguide in the rear section of the rear section of the coupling section in a first-order mode, and the optical signal changes into an OFF state, a waveguide of the main waveguide, which is connected to the main waveguide from the output side of the optical coupler section, is a multi-mode waveguide which guides a beam in a multi-mode, the subsidiary waveguide is configured to split the first-order mode from the main waveguide, and the mode splitter includes a photo detector which monitors a light intensity of a beam in the first-order mode branched into the subsidiary waveguide, and wherein a light-absorbing layer doped with impurities is provided in a termination section of the subsidiary waveguide.

11. The optical waveguide device according to claim 10, wherein two input-side waveguides and an output-side waveguide, which are connected to the optical coupler section, are multi-mode waveguides which guide a beam in a multi-mode.

12. The optical waveguide device according to claim 10, further comprising:

a Mach-Zehnder optical modulator constituted of an optical splitter section which splits one input beam into two split beams and the optical coupler section, wherein in the Mach-Zehnder optical modulator, the mode splitter is disposed in at least one of the rear section of the optical coupler section and inside the Mach-Zehnder optical modulator which is between the optical splitter section and the optical coupler section.

13. The optical waveguide device according to claim 10, further comprising:

an optical splitter section which splits one input beam into two split beams and is provided in a front section which is on an input side of the optical coupler section, wherein a first output beam from the optical splitter section is input to the optical coupler section through a waveguide having the phase modulator, and a second output beam from the optical splitter section is input to the optical coupler section through a waveguide having no phrase modulator.

14. The optical waveguide device according to claim 10, wherein the optical coupler section is an MMI-type optical coupler.

15. The optical waveguide device according to claim 10, wherein the optical coupler section is a Y-type coupler/splitter.

16. The optical waveguide device according to claim 10, further comprising:

a photo detector and an electric wire for ejecting a current from the photo detector which are disposed at a front end of the termination section of the subsidiary waveguide.

17. The optical waveguide device according to claim 10, wherein the subsidiary waveguide further comprises an initiation section, extending from an input end of the subsidiary waveguide to the coupling section of the subsidiary waveguide, a termination section, extending from the coupling section of the subsidiary waveguide to a output end of the subsidiary waveguide, wherein the initiation section is substantially symmetrical to the termination section with respect to the coupling section, and the initiation section smoothly curves toward the main waveguide as the initiation section curves from the input end of the subsidiary waveguide toward the coupling section of the subsidiary waveguide.

18. An optical waveguide device comprising:

an optical splitter section which splits one input beam into two output beams; and a mode splitter which includes a main waveguide in which beams are configured to be propagated in at least two propagation modes with different propagation orders and a subsidiary waveguide which includes a coupling section disposed in parallel with the main waveguide at a certain distance away from the main waveguide so as to constitute a directional coupler and is configured to split at least one propagation mode out of the two or more propagation modes from the main waveguide, the mode splitter being provided in a front section which is on an input side of the optical splitter section; and a phase modulator which is provided in a rear section which is on an output side of the optical splitter section, wherein $n_{core}/n_{cladding}$ which is a refractive index ratio between a core and a cladding which constitute the main waveguide and the subsidiary waveguide is in a range of 101% to 250%, a waveguide, which is connected to the input side of the optical splitter section from the main waveguide, is a multi-mode waveguide which guides a beam in a multi-mode, the subsidiary waveguide is configured to split high-order modes from the main waveguide, and wherein a light-absorbing layer doped with impurities is provided in a termination section of the subsidiary waveguide.

19. The optical waveguide device according to claim 18, wherein an input-side waveguide and two output-side waveguides, which are connected to the optical splitter section, are multi-mode waveguides which guide a beam in a multi-mode.

20. The optical waveguide device according to claim 18, further comprising:

a Mach-Zehnder optical modulator in which the optical splitter section is mounted, wherein in the Mach-Zehnder optical modulator, the mode splitter is disposed in the front section which is on an input side of the optical coupler section.

21. The optical waveguide device according to claim 18, further comprising:
an optical coupler section which couples two input beams into one output beam and is provided in a rear section which is on an output side of the optical splitter section, wherein
a first output beam from the optical splitter section is input to the optical coupler section through a waveguide having the phase modulator, and a second output beam from the optical splitter section is input to the optical coupler section through a waveguide having no phrase modulator.

22. The optical waveguide device according to of claim 18, wherein the splitter section is an MMI-type optical splitter.

23. The optical waveguide device according to of claim 18, wherein the splitter section is a Y-type splitter.

24. The optical waveguide device according to claim 18, further comprising:
a photo detector and an electric wire for ejecting a current from the photo detector which are disposed at a front end of the termination section of the subsidiary waveguide.

25. The optical waveguide device according to claim 18, wherein the subsidiary waveguide further comprises an initiation section, extending from an input end of the subsidiary waveguide to the coupling section of the subsidiary waveguide, a termination section, extending from the coupling section of the subsidiary waveguide to an output end of the subsidiary waveguide, wherein the initiation section is substantially symmetrical to the termination section with respect to the coupling section, and the initiation section smoothly curves toward the main waveguide as the initiation section curves from the input end of the subsidiary waveguide toward the coupling section of the subsidiary waveguide.

26. An optical waveguide device comprising:
a mode splitter including a main waveguide in which beams are configured to be propagated in at least two propagation modes with different propagation orders and a subsidiary waveguide which includes a coupling section disposed in parallel with the main waveguide at a certain distance away from the main waveguide so as to constitute a directional coupler and is configured to split at least one propagation mode out of the two or more propagation modes from the main waveguide, wherein
$n_{core}/n_{cladding}$ which is a refractive index ratio between a core and a cladding which constitute the main waveguide and the subsidiary waveguide is in a range of 101% to 250%,
a material of the core includes semiconductor materials, the subsidiary waveguide is configured to split high-order modes from the main waveguide, and a light-absorbing layer doped with impurities is provided in a termination section of the subsidiary waveguide.

27. The optical waveguide device according to claim 26, further comprising:
a Mach-Zehnder optical modulator which includes a waveguide in which beams are configured to be propagated in at least two propagation modes with different propagation orders, wherein
the mode splitter is disposed in at least one of a front section which is on an input side of the Mach-Zehnder optical modulator, a rear section which is on an output side of the Mach-Zehnder optical modulator, and inside the Mach-Zehnder optical modulator which is between an optical splitter section and an optical coupler section.

28. The optical waveguide device according to claim 27, further comprising:
a Mach-Zehnder interferometer including a plurality of the Mach-Zehnder optical modulators therein.

29. The optical waveguide device according to claim 26, wherein
the subsidiary waveguide further includes a termination section connected to a rear end section of the coupling section, and
the subsidiary waveguide smoothly curves away from the main waveguide as the termination section curves away from the rear end section.

30. The optical waveguide device according to claim 26, comprising: a plurality of the mode splitters, wherein
a difference between a width of the main waveguide and a width of the subsidiary waveguide in each directional coupler is within ±10% or less, and
a gap between the coupling section of the subsidiary waveguide and the main waveguide and a length of the coupling section of the subsidiary waveguide are equal in every directional coupler.

31. The optical waveguide device according to claim 26, comprising: a plurality of the mode splitters, wherein
a difference between a width of the main waveguide and a width of the subsidiary waveguide in each directional coupler is within ±10% or less, and
a gap between the coupling section of the subsidiary waveguide and the main waveguide and a length of the coupling section of the subsidiary waveguide vary in every directional coupler.

32. The optical waveguide device according to claim 26, wherein
a material of the core is Si and a material of the cladding is $SiO_2$.

33. The optical waveguide device according to claim 26, wherein
the main waveguide forms a curved line and the subsidiary waveguide forms a straight line.

34. The optical waveguide device according to claim 26, wherein the subsidiary waveguide further comprises an initiation section, extending from an input end of the subsidiary waveguide to the coupling section of the subsidiary waveguide, a termination section, extending from the coupling section of the subsidiary waveguide to an output end of the subsidiary waveguide, wherein the initiation section is substantially symmetrical to the termination section with respect to the coupling section, and the initiation section smoothly curves toward the main waveguide as the initiation section curves from the input end of the subsidiary waveguide toward the coupling section of the subsidiary waveguide.

* * * * *